(12) United States Patent
Vook et al.

(10) Patent No.: US 8,509,112 B2
(45) Date of Patent: *Aug. 13, 2013

(54) METHOD AND APPARATUS FOR CLOSED LOOP TRANSMISSION

(75) Inventors: Frederick W. Vook, Schaumburg, IL (US); Xiangyang Zhuang, Lake Zurich, IL (US); Kevin L. Baum, Rolling Meadows, IL (US); Timothy A. Thomas, Palatine, IL (US)

(73) Assignee: Motorola Mobility LLC, Libertyville, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/486,144

(22) Filed: Jun. 1, 2012

(65) Prior Publication Data

US 2012/0243501 A1    Sep. 27, 2012

Related U.S. Application Data

(60) Continuation of application No. 12/169,783, filed on Jul. 9, 2008, now Pat. No. 8,289,863, which is a division of application No. 11/004,262, filed on Dec. 3, 2004, now Pat. No. 7,773,535.

(60) Provisional application No. 60/571,317, filed on Aug. 12, 2004.

(51) Int. Cl.
*H04W 4/00* (2009.01)
*H04L 12/26* (2006.01)

(52) U.S. Cl.
USPC .......................................... 370/252; 370/329

(58) Field of Classification Search
USPC ................. 370/252, 276–281, 310, 328–330, 370/332, 334, 338, 341, 344, 350; 455/403, 455/422.1, 434, 450–452.2, 464, 41.2, 509, 455/513, 517, 550.1, 561, 69, 62
See application file for complete search history.

(56) References Cited

U.S. PATENT DOCUMENTS

| | | |
|---|---|---|
| 6,510,174 B1 | 1/2003 | Sexton et al. |
| 6,996,375 B2 | 2/2006 | Dent et al. |
| 7,248,645 B2 | 7/2007 | Vialle et al. |
| 7,248,841 B2 | 7/2007 | Agee et al. |

(Continued)

OTHER PUBLICATIONS

Dale Branlund, et al, "AAS Enhancements for OFDMA PHY," IEEE 802.16 Broadband Wireless Access Working Group, <http://ieee802.org/16>, IEEE 802.16d contribution, IEEE C802.16d-04/73r4, Apr. 28, 2004. 43 pages.

(Continued)

*Primary Examiner* — Kerri Rose

(57) ABSTRACT

In a wireless communication system, a method and apparatus for closed loop transmission is disclosed. In accordance with the preferred embodiment of the present invention, a time frequency portion of an uplink frame is dynamically reserved as a sounding zone for uplink channel sounding. A first message is transmitted to a first subscriber station in a downlink frame assigning a time-frequency resource within the sounding zone, and a sounding waveform. Furthermore, a signal is received from the subscriber station within the assigned time-frequency resource, a partial channel response is determined from the received sounding signal, and the subsequent transmission to the subscriber station is tailored based on the at least partial channel response.

23 Claims, 15 Drawing Sheets

(56) References Cited

U.S. PATENT DOCUMENTS

| | | |
|---|---|---|
| 2002/0172186 A1 | 11/2002 | Larsson |
| 2004/0114560 A1 | 6/2004 | Jacobsen |
| 2005/0009483 A1 | 1/2005 | Eilts et al. |
| 2005/0101259 A1 | 5/2005 | Tong et al. |
| 2005/0201296 A1 | 9/2005 | Vannithamby et al. |
| 2005/0227628 A1 | 10/2005 | Inanoglu |
| 2005/0289256 A1 | 12/2005 | Cudak et al. |
| 2007/0064641 A1 | 3/2007 | Laroia et al. |
| 2008/0108310 A1 | 5/2008 | Tong et al. |
| 2008/0137562 A1 | 6/2008 | Li et al. |

OTHER PUBLICATIONS

Marzetta, et al., "Fast Transfer of Channel State Information in Wireless Systems," Jun. 14, 2004.

Jotten, et al., "Efficient Representation and Feedback Signalling of Channel State Information in Frequency Division Duplexing MIMO Systems," IEEE The 5th International Symposium on Wireless Personal Multimedia Communications, 2002, Oct. 27-30, 2002, vol. 2, pp. 444-448.

Vook, et al., "Signalling Methodologies to Support Closed-Loop Transmit Processing in TDD-OFDMA," IEEE 802.16 Broadband Wireless Access Working Group, <http://ieee802.org/16>, IEEE 802.16d contribution, IEEE C802.16e-04/103r2, Jul. 7, 2004.

200

300

400

500

600

700

800

900

1100

1000

1200

1300

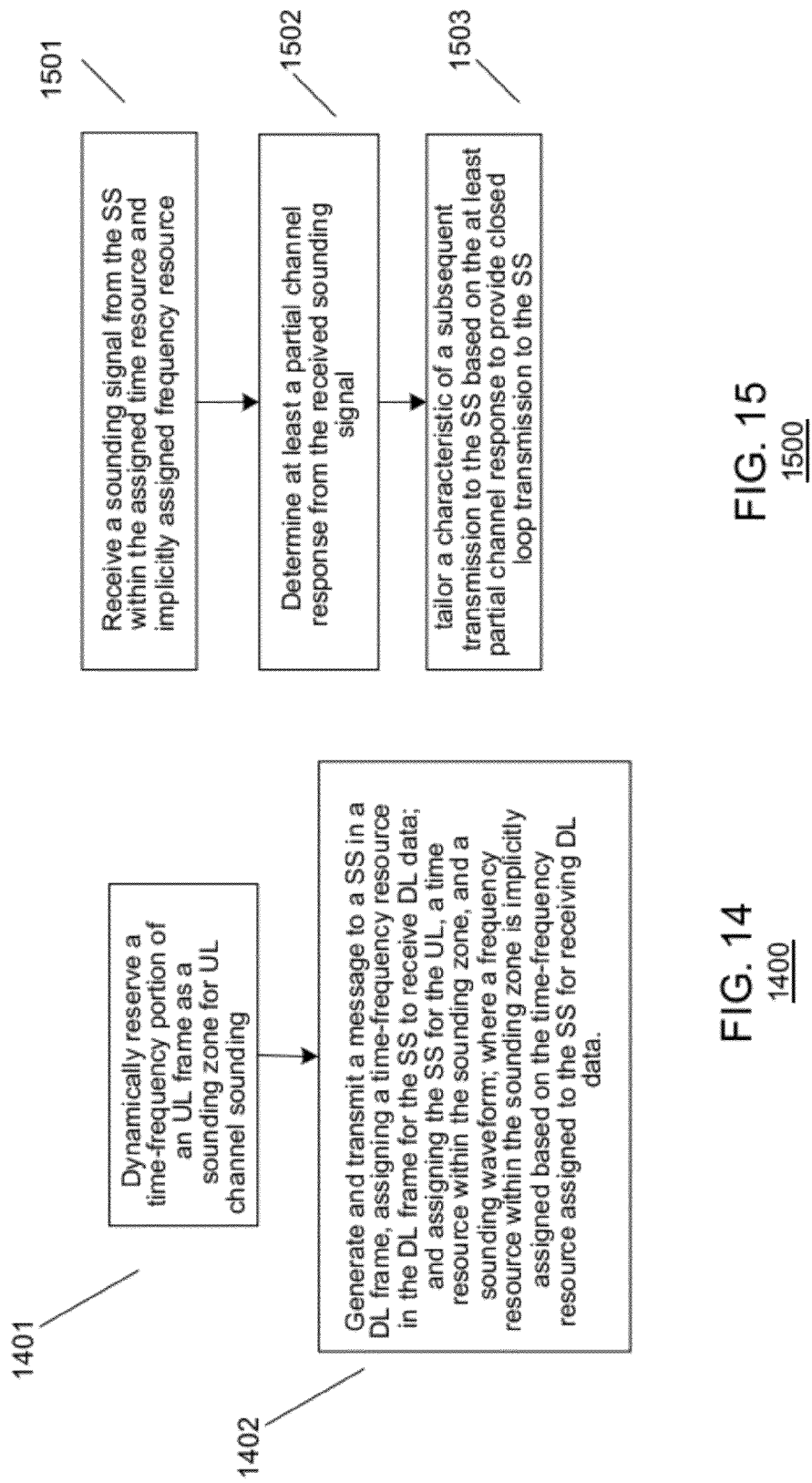

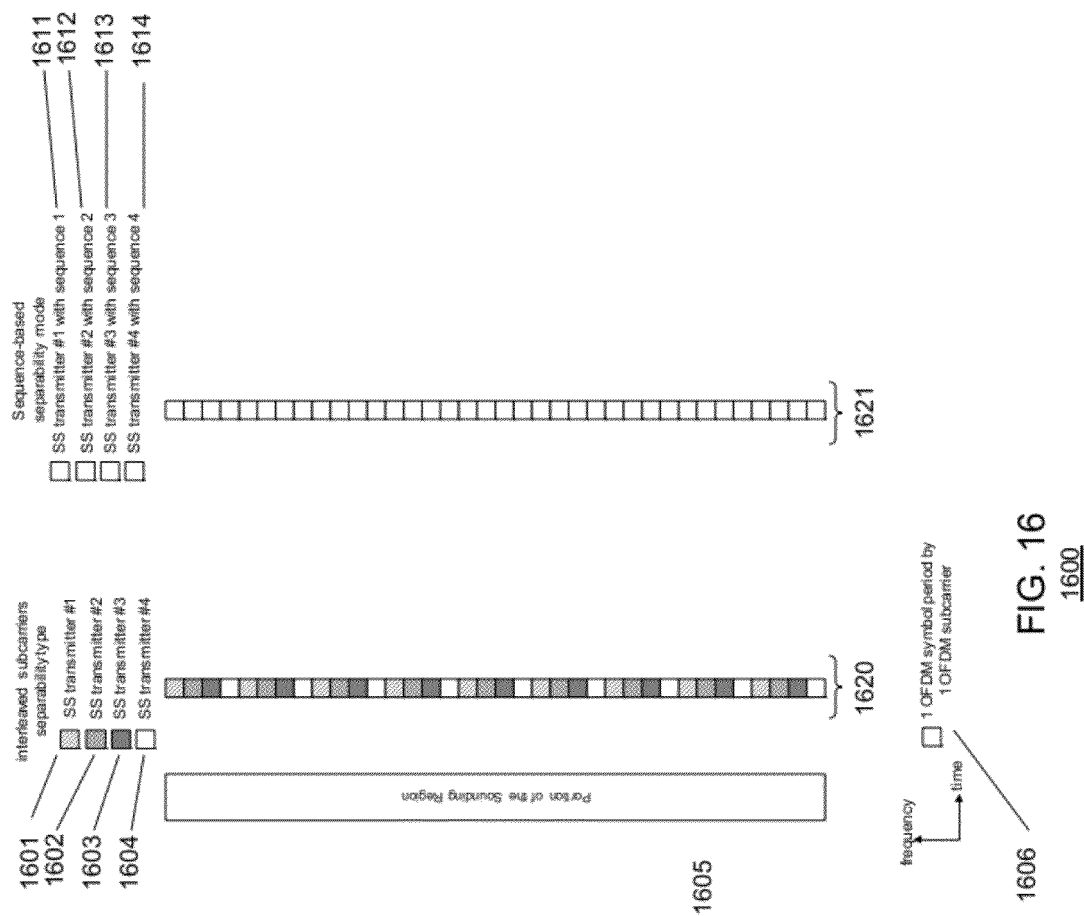

METHOD AND APPARATUS FOR CLOSED LOOP TRANSMISSION

RELATED APPLICATIONS

The present application is a continuation of U.S. patent application Ser. No. 12/169,783, filed Jul. 9, 2008, now U.S. Pat. No. 8,289,863, which is a divisional application of U.S. patent application Ser. No. 11/004,262 filed Dec. 3, 2004, now U.S. Pat. No. 7,773,535 B2, which claims priority to U.S. Provisional Patent Application Ser. No. 60/571,371, filed Aug. 12, 2004.

FIELD OF THE INVENTION

The present invention relates generally to communication systems, and in particular, to a method and apparatus for closed loop transmission.

BACKGROUND OF THE INVENTION

In mobile broadband cellular communication systems, there are several physical layer techniques that require the transmitter to be provided with knowledge of the channel response between the transmitter and receiver. Transmission techniques that make use of the channel response between the transmitter and receiver are called closed-loop transmission techniques. One example of closed-loop transmission is the use of a closed-loop transmit antenna array at the transmitter. A closed loop transmit antenna array is an array of multiple transmit antennas where the signals fed to each antenna are weighted in such a way as to control the characteristics of the transmitted signal energy according to some pre-defined optimization strategy. Generally, the closed-loop transmit antenna array weights the transmitted antenna signals based on knowledge of the space-frequency channel response between each transmit antenna and each receive antenna and attempts to optimize the characteristics of the received signal processed by the receiving device. For single antenna transmitters, the transmitter can use the knowledge of the channel to pre-equalize the channel so as to reduce or even eliminate the need for complex receive equalization at the receiver. Having knowledge of the channel response at the transmitter can also be used to select the best modulation and coding rate to use when transmitting data to the receiver.

In general, there are two methods for providing a transmitter with knowledge of the channel between each transmit antenna and each receive antenna. This discussion is focused at the downlink of a cellular system where the base station (BS) is the transmitter and a subscriber station (SS) is the receiver.

The first method is based on feedback messages from the SS, where the SS measures the channel response between the BS antennas and the SS antennas and transmits a feedback message back to the BS containing enough information that enables the BS to reconstruct the downlink channel response and perform closed loop transmission. For example, the SS could feedback a quantized version of the downlink channel estimates.

The second method is based on the reciprocity of the RF channel response in a TDD system. In a static (i.e., zero velocity) TDD system, the RF propagation channel is reciprocal, which means the downlink RF channel matrix (where the matrix refers to the channel gains between each transmit and receive antenna) at a given time-frequency point is simply the matrix transpose of the uplink RF channel matrix at the same time-frequency point. Therefore in a TDD system, a downlink channel response can sometimes be derived from an uplink data transmission if the data transmission includes pilot signals. However, in modern digital communication systems, traffic (such as web browsing) is often asymmetric, meaning that there may not be an uplink transmission associated with each downlink transmission. Or, in a broadband system a typical uplink data transmission may be of a smaller bandwidth than the typical downlink data transmission. These issues can severely degrade the performance of closed loop transmission in systems based on reciprocity. Therefore, there is a need for a closed loop transmission methods and associated signaling methods that can overcome these limitations.

BRIEF DESCRIPTION OF THE DRAWINGS

FIG. 14 is a flowchart showing the operation of the uncoupled sounding method in the downlink.

FIG. 15 is a flowchart showing the operation of the uncoupled sounding method in the uplink.

FIG. 16 is a time-frequency diagram illustrating two methods of achieving sounding signal separability within a same time-frequency resource.

SUMMARY OF THE INVENTION

Figure 1:
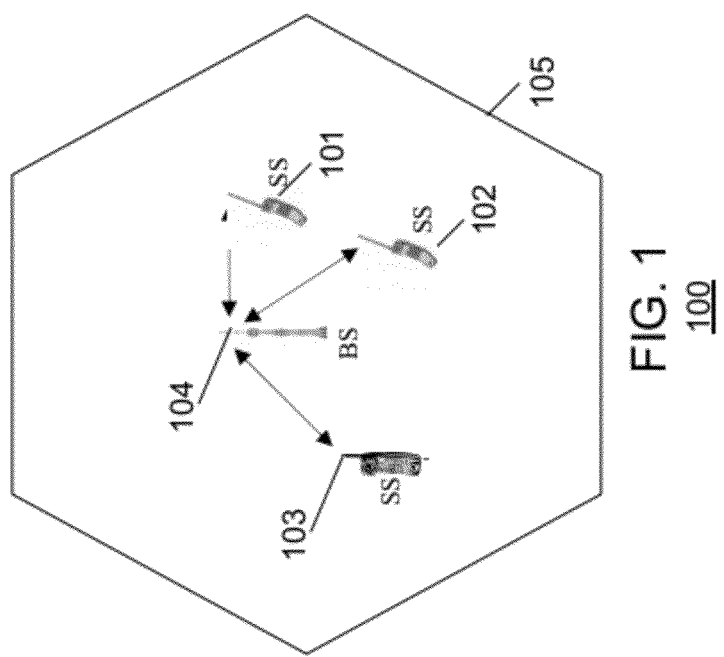
FIG. 1 is a block diagram of a communication system.

One aspect of the invention comprises a signaling method to provide a transmitting device with knowledge of the channel response between each transmit antenna and each receive antenna to enable closed-loop single and multi-stream transmit array processing via uplink channel sounding with assumed antenna array calibration. Several other applications are also possible, for example: pre-equalization for single-transmit antenna systems; and determining the optimal modulation and coding scheme to employ when transmitting to the receiving device. For simplicity, the invention is presented from the point of view of providing a base station (BS) with the channel knowledge needed for setting the transmit weights in a closed-loop antenna array system when transmitting to a subscriber station (SS). It should be clear that the invention applies to scenarios where the roles of a BS and SS are reversed from the roles described herein. For example, the invention can be applied to the scenario where the SS is to be provided with channel knowledge to enable closed-loop transmission from an SS to a BS. Therefore, although the description will focus mainly on the case of the BS performing closed loop transmission to a SS, the term "source communication unit" will refer to a communication unit (e.g., a BS, SS or other transceiver) that can perform closed loop transmission to a "target communication unit".

Also, some terms are used interchangeably in the specification: The terms, channel response, frequency selective channel profile, space-frequency channel response, are all referring to the channel response information needed by the base station in order to utilize closed-loop transmission techniques. The terms waveform and signal are also used interchangeably. A receiving device can be either a base station (BS), subscriber station (SS) or any combination thereof. Also, a transmitting device can be either a BS, SS, or any combination thereof. Additionally, if the system has repeaters, relays or other similar devices, the receiving device or the transmitting device can be a repeater, relay, or other similar device. The repeater or relay can be considered equivalent to an SS if the BS is performing closed-loop transmission to the repeater/relay. The repeater or relay can be considered equivalent to a BS if the relay is performing closed-loop transmission to the SS. The term fast Fourier transform (FFT) and inverse fast Fourier transform (IFFT) refer to discrete Fourier transform (or similar transform) and inverse discrete Fourier transform (or similar transform) respectively.

One aspect of the invention is the dynamic reservation of a Sounding Zone on the uplink. The Sounding Zone is a special region of the uplink for which SSs can transmit special sounding waveforms that enable the base station to measure the uplink channel response, also known as a frequency selective channel profile. With hardware calibration techniques known in the art, the BS can determine the downlink channel response (or frequency selective channel profile) from the measured uplink frequency selective channel profile. Note that in some situations an SS may transmit on only a subset of the uplink channel bandwidth (for example, to overcome noise by increasing the power spectral density of the transmit signal with the same total transmit power), so the BS may only be able to determine and use a partial channel response for that SS.

One aspect of the invention is optional signaling for determining the presence and characteristics of the Sounding Zone. The BS can signal the presence of the sounding zone by transmitting an information element (IE) in the uplink control channel (e.g., the UL-MAP in the IEEE 802.16 standard). This IE can indicate the start time (generally the number of bauds into the UL) and duration (generally measured in number of OFDM bauds). If the sounding baud is not intended to occupy the entire uplink bandwidth, then the IE will contain information specifying the frequency occupancy of the sounding zone. Note that signaling to specify the Sounding Zone is not required—rather, it is helpful for reducing the overhead in the actual sounding assignments made to specific SSs.

One aspect of the invention is a signaling method for specifying the characteristics (i.e., the time-frequency sounding resource and the exact sounding signal) of the uplink sounding transmissions to be used by the SS.

One aspect of the invention is a method for assigning multiple sounding waveforms that are transmitted by different SSs (or by different antennas on the same SS) in the same time-frequency resource, yet are separable by the BS due to the properties of the waveforms. This enables the simultaneous sounding of multiple transmit antennas.

One aspect of the invention is a signaling method for assigning a SS to transmit a sounding signal in a specific time-frequency resource in the uplink frame.

One aspect of the invention is a signaling method that allocates downlink a data transmission to the SS and simultaneously assigns the SS to transmit a sounding signal in a particular time-frequency resource in the UL frame.

Additional aspects of the invention are described in later sections of the specification. The present invention has a number of benefits: The signaling method provides a high level of flexibility and signaling efficiency. The method enables the dynamic allocation of an UL sounding resource to multiple SSs and handles the case where the SSs have single or multiple transmit antennas. The method also provides multiple techniques for making the sounding waveforms separable by the BS, which enables multiple SS antennas (whether the antennas are all on one device or are located on multiple SSs) to sound the UL on the same time-frequency sounding resource. The signaling method is also complementary with other methods of determining the UL channel response. For example, the sounding operations can be disabled (or turned off) if the BS can determine the UL channel response from the data transmitted by the SS on the UL. As part of the method for providing multiple separable sounding waveforms, the signaling method provides the means to decimate the sounding transmissions in frequency so as to increase the transmit power per subcarrier to better support SSs operating in low SNR environments. Also, the waveforms used for sounding transmission are designed to have low peak-to-average power ratio and to have the ability to suppress other cell interference by virtue of their cross-correlation characteristics. Finally, the sounding waveforms provided by the proposed signaling method are designed to enable effective channel estimation at the BS so that the time variations in the channel response can be tracked.

DETAILED DESCRIPTION OF THE INVENTION

Turning now to the drawings, wherein like numerals designate like components, FIG. 1 is a block diagram of communication system 100. Communication system 100 comprises a plurality of cells 105 (only one shown) each having a base station (BS, or base station) 104 in communication with a plurality of subscriber stations (SSs) 101-103. If closed loop transmission is to be performed on the downlink to SS 101, the BS 104 can be referred to as a source communication unit, and the SS 101 can be referred to as a target communication unit. If closed loop transmission is to be performed on the uplink from SS 101 to the BS 104, SS 101 can be referred to as a source communication unit, and the BS 104 can be referred to as a target communication unit. In the preferred embodiment of the present invention, communication system 100 utilizes an Orthogonal Frequency Division Multiplexed (OFDM) or multicarrier based architecture including Adaptive Modulation and Coding (AMC). The architecture may also include the use of spreading techniques such as multi-carrier CDMA (MC-CDMA), multi-carrier direct sequence CDMA (MC-DS-CDMA), Orthogonal Frequency and Code Division Multiplexing (OFCDM) with one or two dimensional spreading, or may be based on simpler time and/or frequency division multiplexing/multiple access techniques, or a combination of these various techniques. However, in alternate embodiments communication system 100 may utilize other cellular communication system protocols such as, but not limited to, TDMA or direct sequence CDMA.

Figure 2:
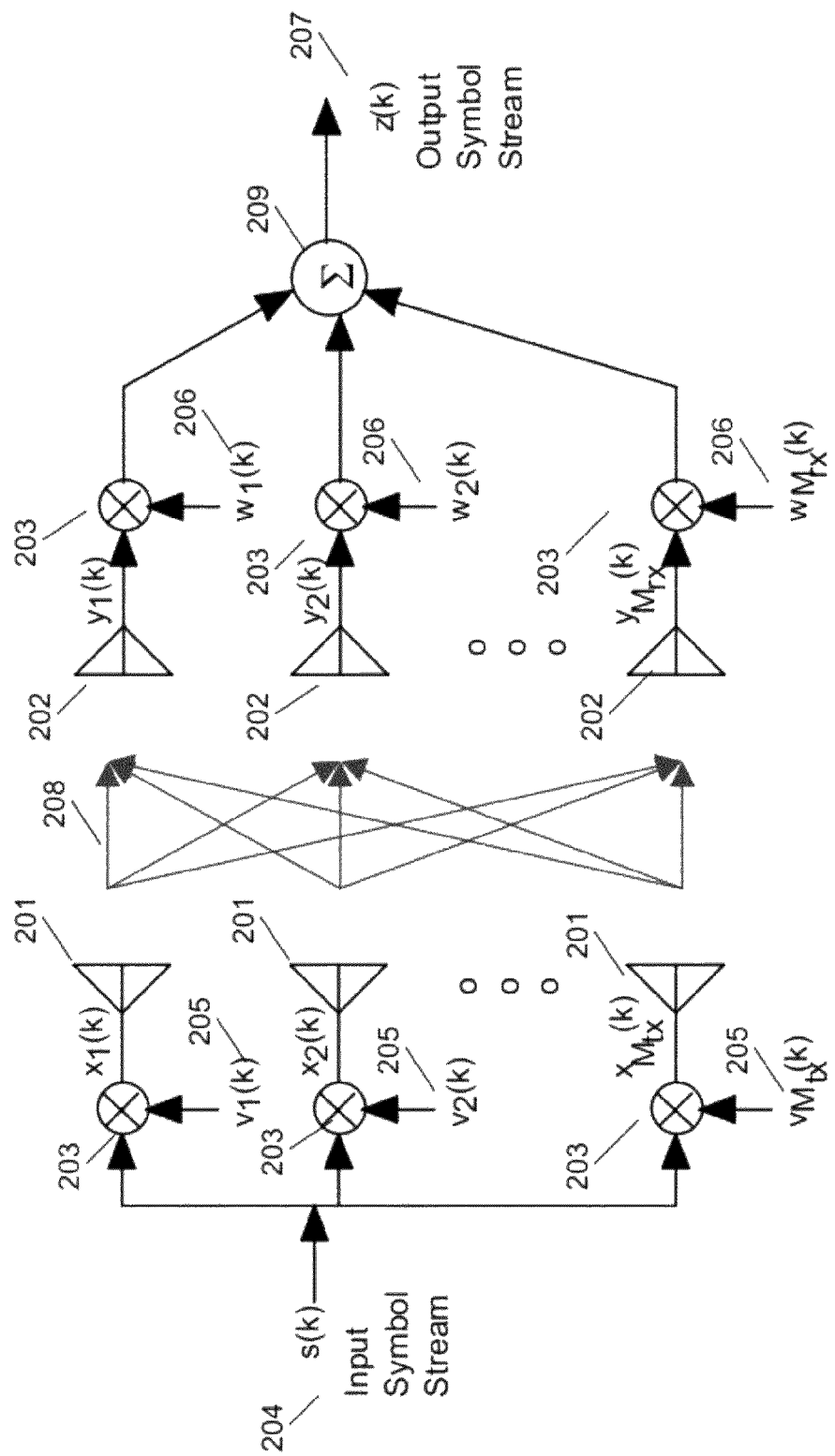
FIG. 2 is a block diagram of a closed-loop transmit antenna array communicating a single data stream to a receiving device having one or more receive antennas.

FIG. 2 is a block diagram of a closed-loop transmit antenna array as part of a source unit communicating a single data stream to a receiving device as part of a target communication unit having one or more receive antennas. Input stream 204 is multiplied by transmit weights 205 using multipliers 203 before being fed to the multiple transmit antennas 201. Multiplying input stream 204 by transmit weights 205, where the transmit weights are based on at least a partial channel response, is one example of tailoring a spatial characteristic of the transmission. Methods for determining the transmit weights from the channel response are known in the art. The signals transmitted from the multiple transmit antennas 201 propagate through a matrix channel 108 and are received by multiple receive antennas 202. The signals received on the multiple receive antennas 102 are multiplied by receive weights 206 using multipliers 203 and summed by a summation device 209 to produce the output symbol stream 207. In an embodiment where the transmitter has only one antenna, the spatial characteristic of the transmit signal cannot be tailored; however, other characteristics of the transmit signal may be tailored based on at least a partial channel response, such as the complex gain of each subcarrier (e.g., in a pre-equalization application), or the modulation and coding used on the subcarriers of the transmit signal.

Figure 3:
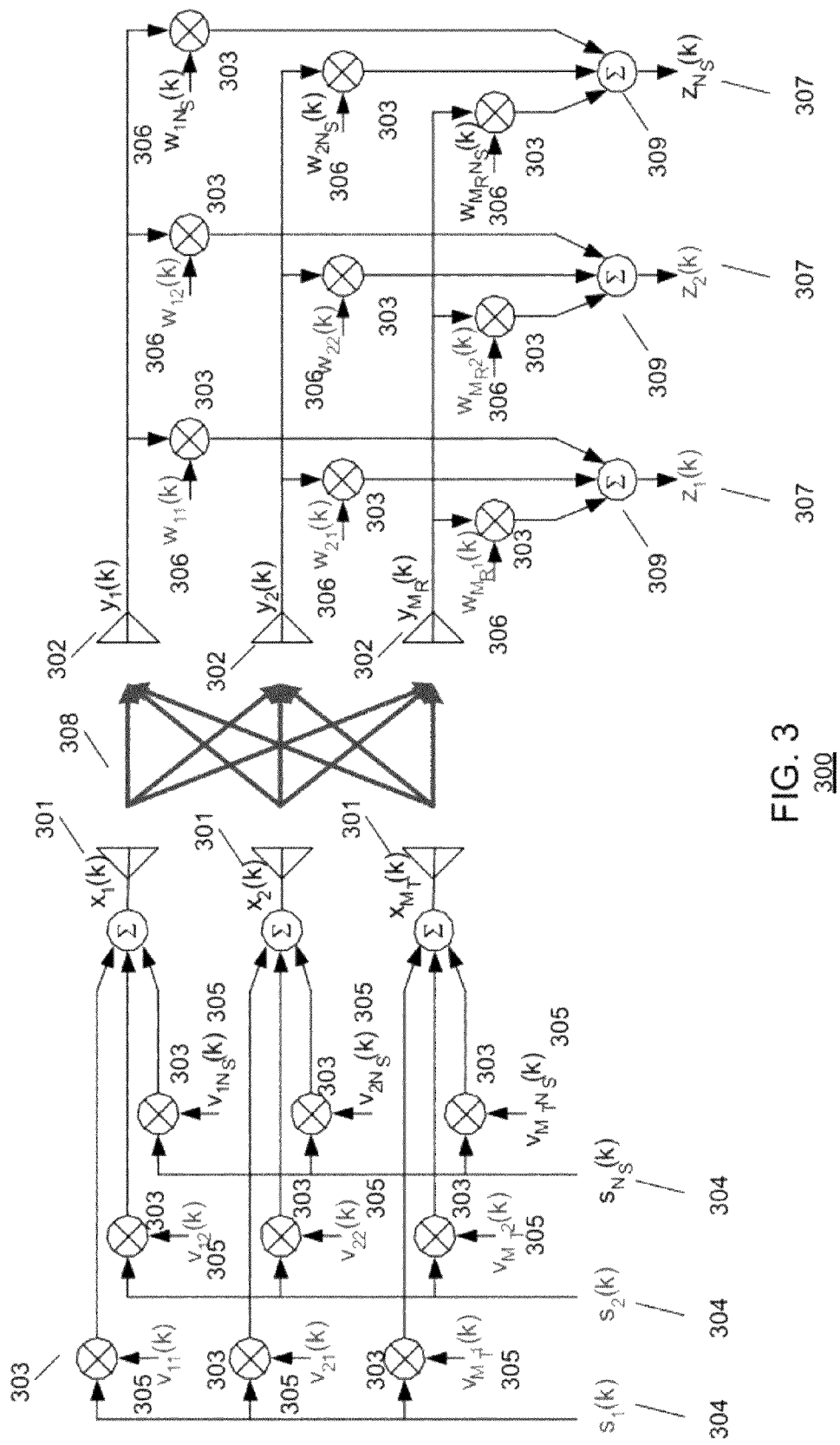
FIG. 3 is a block diagram of a closed-loop transmit antenna array communicating multiple data streams to a receiving device having one or more receive antennas.

FIG. 3 is a block diagram of a closed-loop transmit antenna array as part of a source unit communicating multiple data streams to a receiving device as part of a target communication unit having one or more receive antennas (e.g., a MIMO system). Multiple input streams 304 are multiplied by transmit weights 305 using multipliers 303 before being fed to the multiple transmit antennas 301. The signals transmitted from the multiple transmit antennas 301 propagate through a matrix channel 308 and are received by multiple receive antennas 302. The signals received on the multiple receive antennas 302 are multiplied by receive weights 306 using multipliers 303 and summed by a summation devices 309 to produce the multiple output symbol streams 307. Multiplying input streams 304 by transmit weights 305 where the transmit weights are based on at least a partial channel response is another example of tailoring a spatial characteristic of the transmission. Other embodiments of producing the output symbol streams 307 are possible such as maximum likelihood detection or successive cancellation that may or may not use the receive weights 306 and the multipliers 303.

Figure 4:
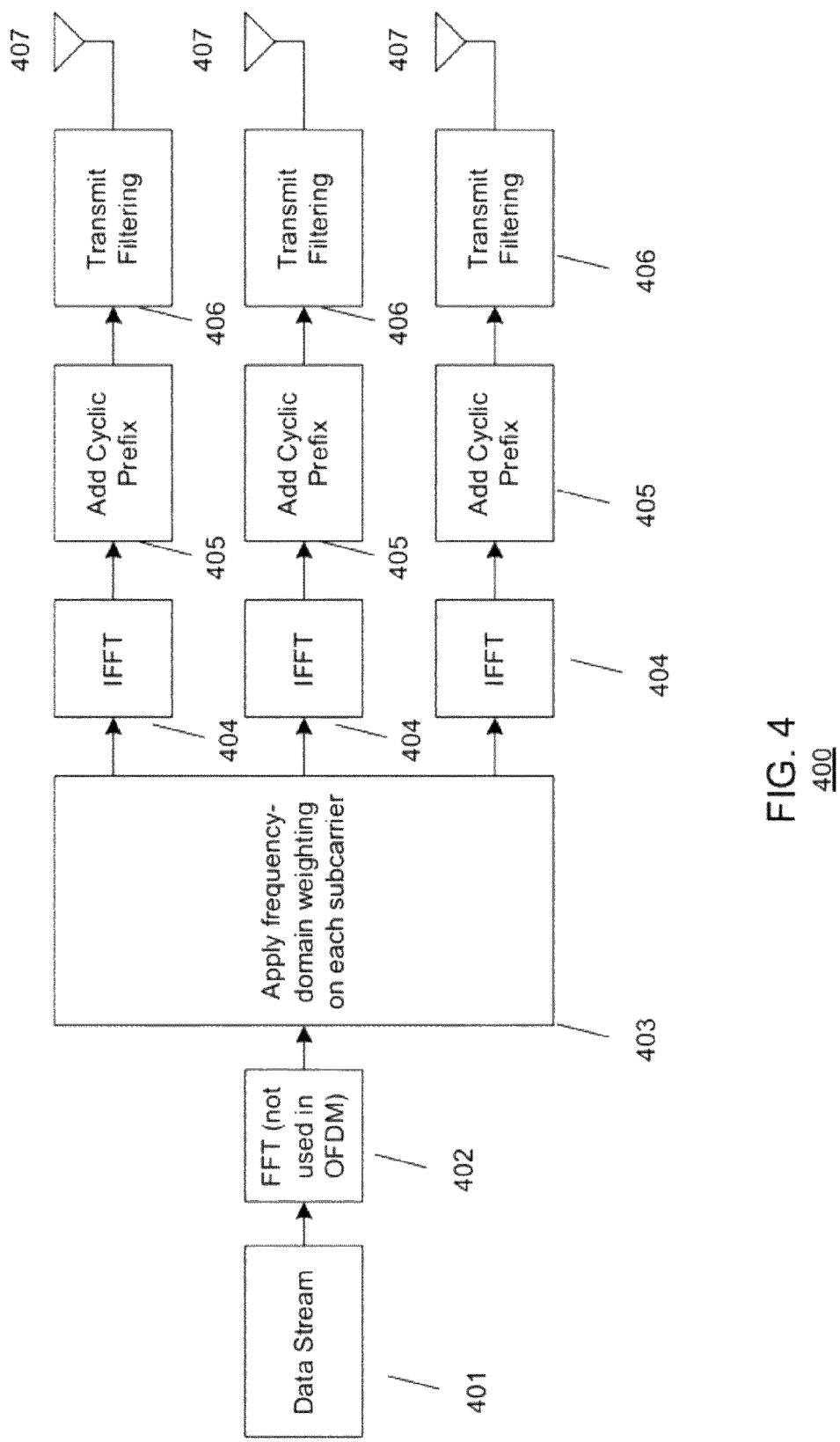
FIG. 4 is a block diagram of a frequency domain-oriented broadband transmission system employing a closed-loop transmit antenna array.

FIG. 4 is a block diagram of a frequency-domain oriented transmission system such as Orthogonal Frequency Division Multiplexing (OFDM) or cyclic prefix single carrier (CP-Single Carrier) in which the transmission techniques of FIG. 2 and FIG. 3 are performed in the frequency domain prior to transmission. In a CP-Single Carrier system, one or more data streams 401 are first brought into the frequency domain with one or more FFTs 402 and the frequency domain data streams are weighted with frequency domain weighting apparatus 403. In OFDM, the one or more data streams 401 are sent directly to frequency domain weighting apparatus 403 without the use of FFT 402. The frequency domain weighting apparatus 403 implements the weighting function shown in the transmit portion of FIG. 2 and FIG. 3 on each subcarrier or frequency bin in the frequency domain. Thus, the transmit signal can be tailored either spatially, or in frequency, or both with this type of a system. The outputs of the frequency domain weighting apparatus 403 are then brought back into the time domain with IFFTs 404. Cyclic prefixes are added 405 as is known in the art. Transmit filtering 406 is then performed before sending the transmitted signals to the transmit antennas 407.

Specifying the Existence and Characteristics of the Sounding Zone

Figure 5:
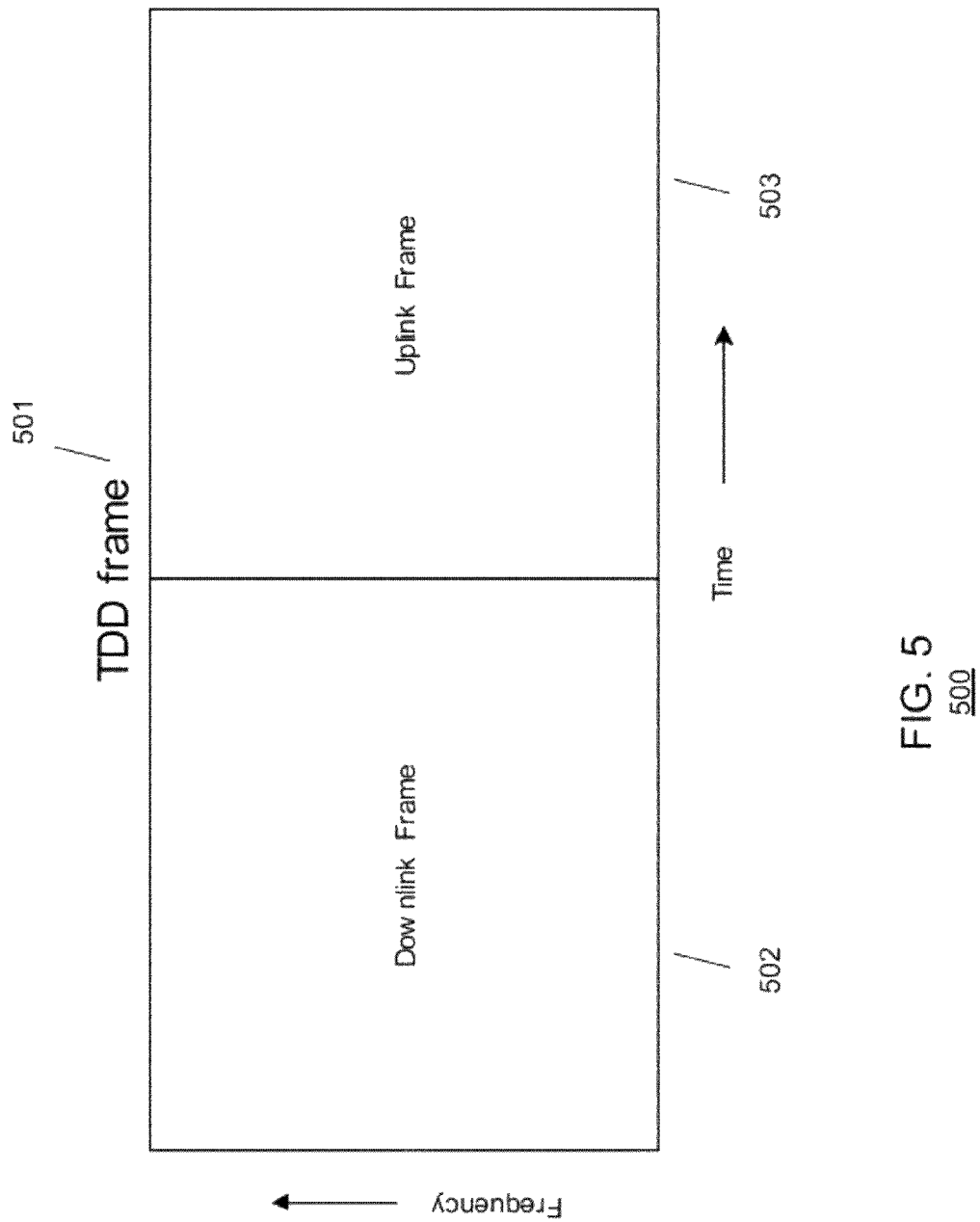
FIG. 5 is a timing diagram of Time Division Duplexing (TDD) frame wherein time is divided into a downlink (DL) portion or frame and an uplink (UL) portion or frame and the downlink and uplink frames occupy the same frequency bandwidth.

One aspect of the invention is the dynamic reservation of a Sounding Zone within the Uplink (UL) of a Time Division Duplexing (TDD) Frame. FIG. 5 shows a timing diagram of one frame 501 of a TDD system, which generally consists of two portions: a downlink (DL) frame or interval 502 and an uplink (UL) frame or interval 503. Both the DL and the UL occupy the same frequency band and are alternated in time. In a communication system having a Base Station (BS), the DL is used for transmissions by the Base Station, and the UL is used for transmissions by the Subscriber Stations (SS). A TDD frame generally consists of one DL frame followed by one UL frame, although variations are possible. The relative length of the DL frame and the UL frame can be adjusted according to the expected relative levels of DL traffic and UL traffic.

The Sounding Zone is a special time-frequency portion of the uplink TDD frame that is dynamically reserved for the transmission of special sounding waveforms by the SSs to enable the BS to measure at least a partial uplink frequency selective channel profile or channel response. To signal both the presence and characteristics of the sounding zone, a special information element (IE) may be transmitted by the BS in the control channel (preferably the UL control channel, which for example in IEEE 802.16 is called the UL-MAP). For the purpose of explanation, this IE will be referred to as the Sounding_Zone_Presence_IE( ) which contains the information that specifies exactly where the sounding zone is located in time and frequency. Note that signaling to specify the Sounding Zone is not required; however, it can reduce the overhead in the actual sounding assignments made to specific SSs by broadcasting some of the information that is useful for all SSs.

The allocated Sounding Zone may be in any time-frequency portion of the uplink frame. Placing the Sounding Zone early in the UL frame increases the available time for the base to process the received sounding waveform. Placing the Sounding Zone late in the UL frame enables better tracking of the channel time variations by providing more up-to-date channel information (relative to the following TDD frames)

Figure 6:
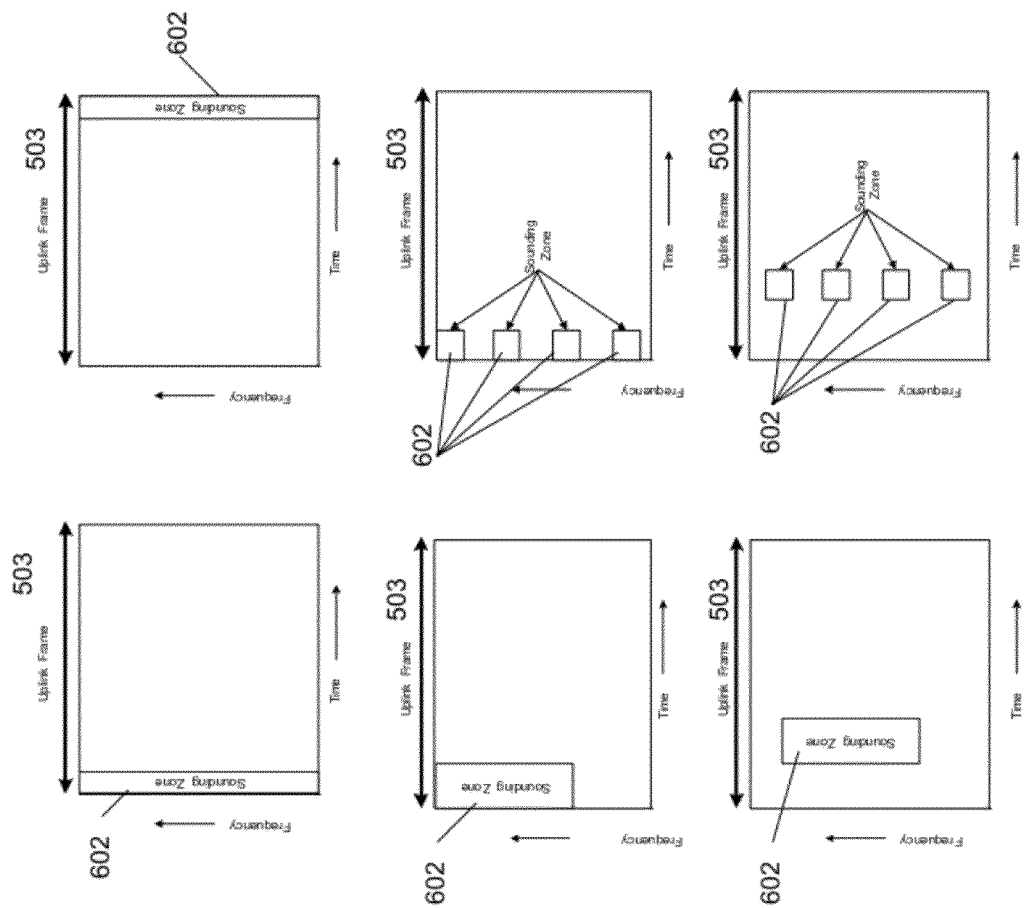
FIG. 6 is a collection of uplink frame diagrams showing different examples of how a time-frequency portion of the uplink frame may be reserved as a sounding zone.

FIG. 6 shows several examples for where the Sounding Zone 602 can be located within the UL frame 503. The Sounding Zone may be dynamically reserved in any time-frequency portion of the uplink frame 503. Placing the Sounding Zone early in the UL frame increases the available time for the base to process the received sounding waveform. Placing the Sounding Zone late in the UL frame enables better tracking of the channel time variations by providing more up-to-date channel information. Note that the sounding zone can be omitted from the UL portion of the frame simply by not transmitting the Sounding_Zone_Presence_IE( ). Alternatively, the information in the Sounding_Zone_Presence_IE( ) can be transmitted with an indication that some number of the following frames will have a Sounding Zone having the same characteristics as those being specified in the IE. This would eliminate the need to transmit a Sounding_Zone_Presence_IE( ) in the control channel of every frame.

Figure 7:
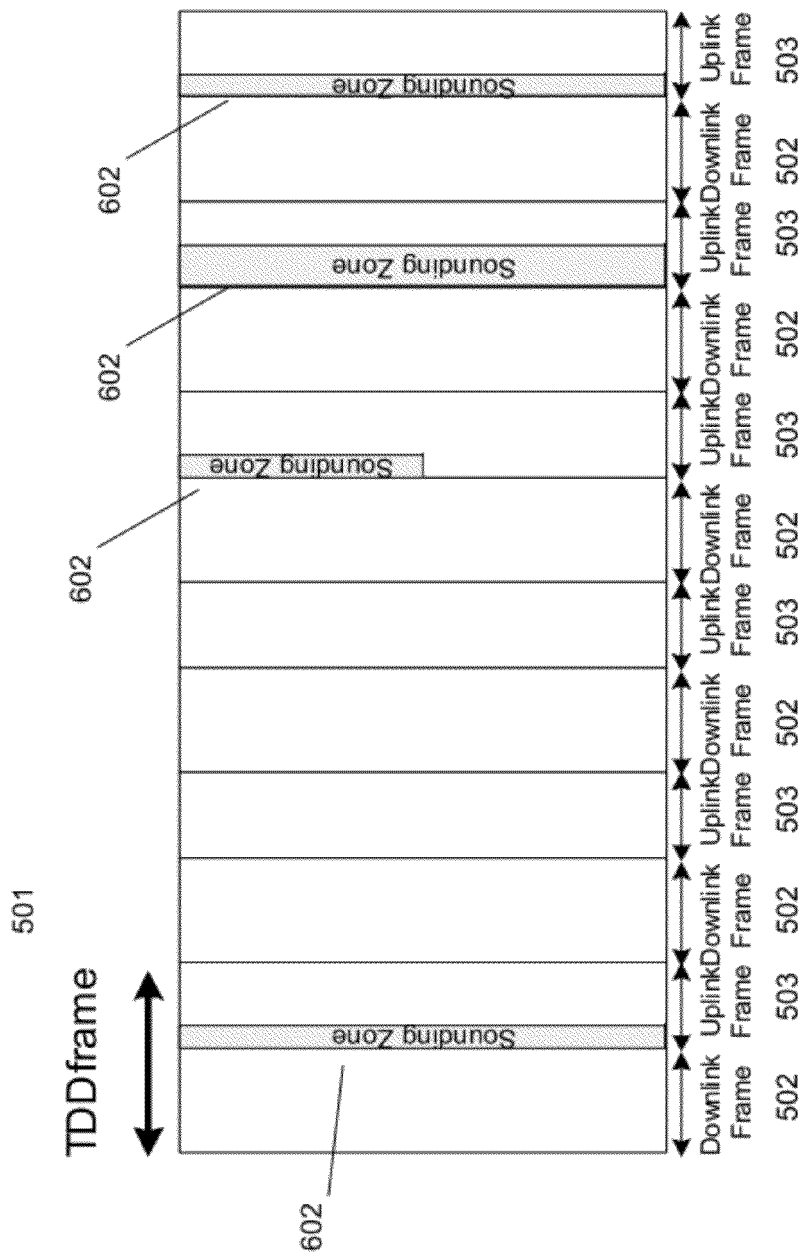
FIG. 7 is a diagram showing an example of how the sounding zone may be dynamically changed from one uplink frame to another.

The Sounding Zone 602 can be dynamically reserved on a frame by frame basis as shown in FIG. 7. FIG. 7 shows multiple consecutive TDD frames 501, each consisting of a downlink frame 502 and an uplink frame 503. The sounding zone 602 is shown to be scheduled in some but not all of the uplink frames in FIG. 7. Furthermore, some uplink frames are shown in FIG. 7 to have different time-frequency resources allocated to the sounding zone. The current sounding zone allocation can be signaled to the SSs by updating and transmitting the Sounding_Zone_Presence_IE( ) on a frame-by-frame basis. By enabling dynamic reservation of the sounding zone, the BS is able to effectively adapt to different scenarios. Some examples of this are as follows. In one example, the size of the sounding zone is selected based on an expected number of SSs that will need to do sounding in the frame where the sounding zone is being reserved. One aspect influencing this is that the number of active SSs over any time interval can vary, so the size of the sounding zone can be dynamically adjusted accordingly. Also, there may be a mixture of closed loop and open loop transmissions being made by the BS, so the size of the sounding zone may need to change accordingly. To accommodate this and other scenarios while minimizing the overhead of the sounding zone, the size of the sounding zone may be changed from the current frame to the next frame.

In a preferred embodiment for an IEEE 802.16-like system, the Sounding Zone is constructed as follows. The signaling parameters of the OFDMA mode of the IEEE 802.16d air interface standard are used to provide a detailed example, but the invention is not limited to this particular example.

The frequency band in the OFDMA mode of IEEE 802.16d is divided into 192 frequency bins, where each frequency bin contains 9 OFDM subcarriers. For the 802.16 example:

To construct the frequency portion of the Sounding Zone, divide the frequency band into 32 sounding frequency blocks, where each block contains 192/32=6 frequency bins. This means each sounding frequency block contains 54 OFDM subcarriers.

The Sounding Zone is allocated some number of OFDMA symbol intervals (also called bauds or OFDM symbol periods) that can vary on a dynamic basis according to the level of traffic that will employ closed loop transmission.

For simplicity, the Sounding Zone is reserved either at the beginning of the UL frame or at the end of the UL frame. Alternatively, the exact location within the UL frame can be specified explicitly, but this would require additional signaling bits in the Sounding_Zone_Presence_IE( ).

According to the above preferred construction guidelines, the Sounding Zone consists of a two dimensional grid of 32 sounding frequency blocks by some number of sounding bauds that can be dynamically adjusted according to the level of DL traffic that will use closed-loop transmission.

In a preferred embodiment for an 802.16-like system, the Sounding_Zone_Presence_IE( ) message contains the following information:
Control code indicating that this IE is a Sounding_Zone_Presence_IE( )
Length of the Sounding Zone in number of symbol intervals (3 bits)
Position of the Sounding Zone (1 bit). If set to one, then the sounding zone is placed at the end of the UL frame. If set to zero, the sounding zone is placed at the beginning of the UL frame.

Note that the sounding zone can be arbitrarily placed at any symbol location within the UL frame by specifying the starting symbol interval of the Sounding Zone rather than using the simple one bit Position field. (More than one bit would be required by this approach.). In an alternate embodiment, the sounding zone may allow some data transmissions to occur within the sounding zone in addition to the channel sounding transmissions if the data transmissions and sounding transmissions are structured so that they do not significantly mutually interfere with each other. This embodiment may be used in systems that use a form of multicarrier CDMA, where sounding transmissions and data transmissions that occupy the same time-frequency resource are assigned different and preferably orthogonal spreading codes.

Once the characteristics of the Sounding Zone are determined, there are two basic signaling methods for allocating time-frequency resources within the Sounding Zone for SSs to transmit sounding waveforms to the BS. The first method is for the BS to generate and transmit a message, which may be transmitted in the control channel of the DL (preferably in the UL control channel, also known as the UL-MAP in the IEEE 802.16d system) that assigns the time-frequency resource and the sounding waveform (or sounding signal) to be used by the SS when sounding on the UL. The sounding waveform is preferably specified by a combination of a separability mode, a separability parameter, and a sounding sequence index that are preferably included in the message. Other information, such as a BS identification number that is already known to the SS by other means, may also be used together with the message received by the SS to determine the exact sounding waveform to be used by the SS.

The second method is to piggy-back sounding instructions on a downlink data allocation in the DL control channel. The first method is called "Uncoupled Sounding" and the second method is called "Coupled Sounding". These two methods are described in the following sections.

In an alternate embodiment, an explicit message (such as the UL_Sounding_Zone_Presence_IE( )) to reserve a portion of the UL for channel sounding purposes is not used, and the reservation of an UL time-frequency resource for sounding purposes is performed by the base station without informing the SSs. In this embodiment, the BS simply generates and transmits a message assigning a SS a time-frequency resource and a sounding waveform (or sounding signal) to be used by the SS when sounding on the UL where the sounding waveform is preferably specified by a combination of a separability mode, a separability parameter, and a sounding sequence index that are preferably included in the message.

Uncoupled Sounding Method

In the first method, the BS reserves a time-frequency portion of an UL frame as a sounding zone for UL channel sounding, generates and transmits a message to a SS in a DL frame. The message assigns or specifies a time-frequency resource within the sounding zone, and a sounding waveform. The sounding waveform is preferably assigned by a separability mode, a separability parameter, and a sounding sequence index in the message.

One example of using this method for an 802.16-like system is to define an information element (IE), or message, preferably in the control channel (and preferably in the UL control portion) that contains the information assigning which time-frequency resource should be used in the UL Sounding Zone and which sounding waveform should be used within that time-frequency resource. This information element that tells the SS the time-frequency resource and the signal with which to sound within the Sounding Zone is called the UL_Uncoupled_Sounding_IE( ). After receiving the UL_Uncoupled_Sounding_IE( ) addressed to the SS from the BS in a DL frame, the SS determines a sounding signal to be used and transmits the sounding signal within the assigned time-frequency resource in the UL frame. The details of how to specify the characteristics of the sounding signals/waveforms are presented later.

Figure 8:
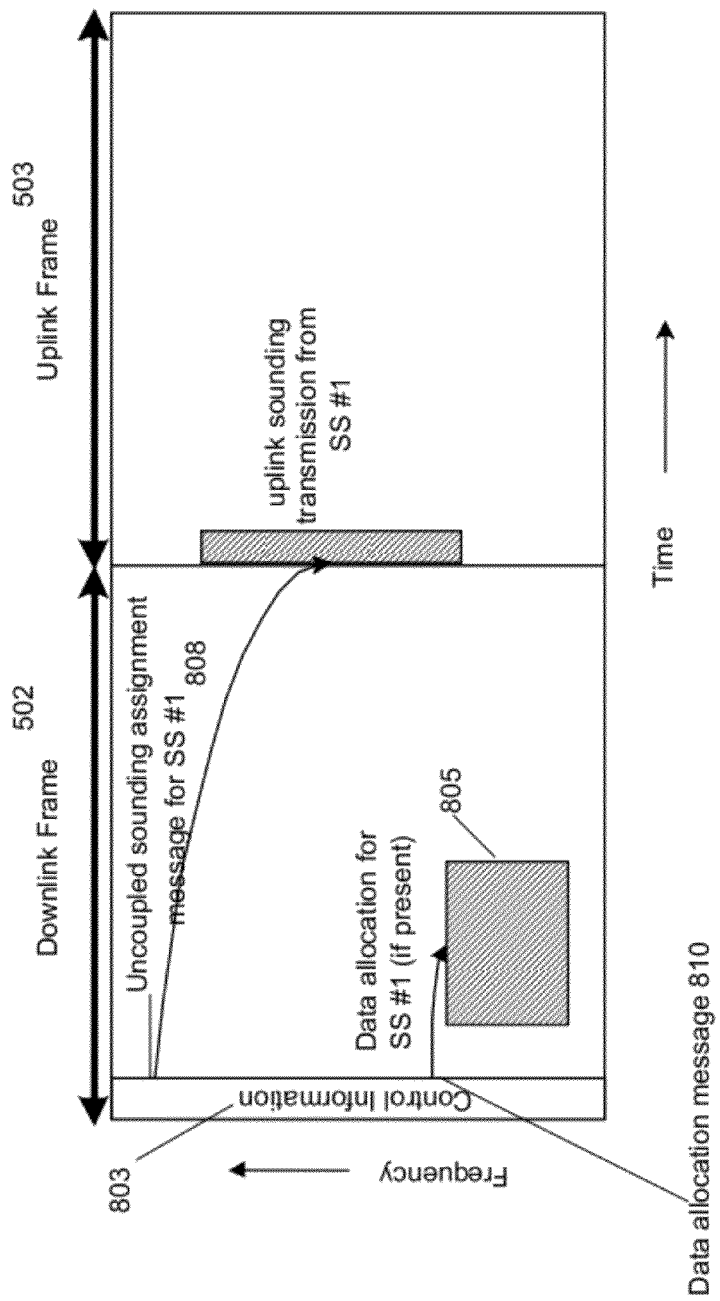
FIG. 8 is a TDD frame diagram showing an uncoupled sounding method wherein a base station (BS) transmits a message to a subscriber station (SS) in the DL frame instructing the SS to transmit a sounding signal in the uplink sounding zone.

FIG. 8 contains a time-frequency diagram that shows the uncoupled sounding method for an 802.16-like system. In this figure, the control information 803 transmitted in the DL 502 contains, among other things, an UL_Uncoupled_Sounding_IE( ) that is essentially an uncoupled sounding assignment message 808 that is generated and transmitted to the first Subscriber Station (SS#1). This uncoupled sounding assignment message 808, addressed to SS#1, tells the SS to transmit an uplink sounding transmission 804 in the UL portion 503 of the frame by assigning a time-frequency resource within the sounding zone and a sounding waveform. As shown in FIG. 8, note that the control information 803 can also contain a data allocation for SS#1, which is simply a message that reserves a portion 805 of the DL 502 for data transmission to SS#1. In FIG. 8, the data allocation message and subsequent transmission of the data to SS#1 is unrelated to, or "uncoupled" from, the command to transmit sounding in the UL portion of the frame. In other words, the uncoupled sounding assignment message 808 (or UL_Uncoupled_Sounding_IE( )) is independent of the data allocation message 810 in the control information 803. The next section describes an alternative embodiment in which the data assignment for the DL and the uplink sounding assignment are coupled together and transmitted in one information element within the control channel.

Figure 9:
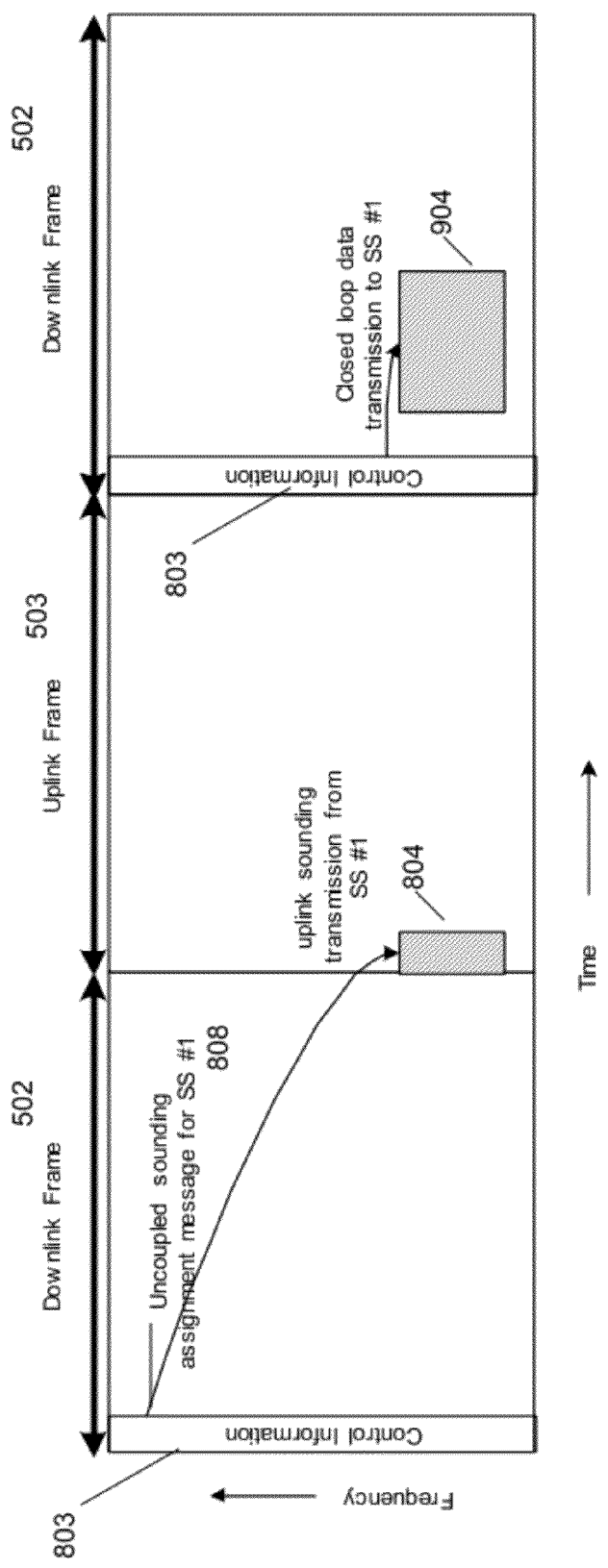
FIG. 9 is a diagram showing an uncoupled sounding method followed by a closed-loop transmission in the next downlink frame.

FIG. 9 contains a timing diagram of how the uncoupled sounding assignment message 808 enables closed loop transmission strategies on the DL 502. First, the base transmits an uncoupled sounding assignment message 808, (or UL_Uncoupled_Sounding_IE( )) in the UL control channel (control information 803) in the DL portion 502 of the first frame. This message assigns a time-frequency resource within the sounding zone and a sounding waveform to the SS. The SS then transmits an uplink sounding signal 804 according to the instructions provided in the UL_Uncoupled_Sounding_IE( ) in the DL portion 502 of the first frame (based on the assigned time-frequency resource and the assigned sounding waveform). The base receives the sounding signal 804 to estimate or determine at least a portion of the UL channel response, and transforms the estimated uplink channel response portion to a Downlink channel response. This downlink channel response is then used to tailor a characteristic of a subsequent transmission to the SS based on the at least partial channel response to provide closed-loop transmission 904 on the portion of the frequency band that coincides with the portion of the frequency band occupied by the uplink sounding waveform 804. In other words, the closed-loop data transmission 904 is performed based on the sounding waveform 804 received from the SS in the UL 503 of the immediately preceding frame. In an alternative embodiment, the information learned from the sounding waveform 804 may be used in a closed loop data transmission that is performed at any subsequent frame, not necessarily only at the immediately following frame shown in FIG. 9. One example for this scenario is when the channel varies slowly. In this case, the closed-loop transmission may be performed based on the information learned from any number of previously transmitted sounding waveforms, the closed loop transmission will not be limited to only the portion of the frequency band that coincides with the portion of the frequency band occupied by the uplink sounding waveform 804 received in the UL 503 of the immediately preceding frame shown in FIG. 9. Instead, FIG. 9 just shows the timing diagram for high-mobility cases when the most prompt channel knowledge is desired. Examples of tailoring a characteristic to the SS to provide closed-loop transmission include but are not limited to computing and applying complex transmit weights for each transmit antenna (spatial transmit weights, computing and applying complex transmit weights for each subcarrier of each antenna (space-frequency transmit weights), selecting an appropriate modulation/coding scheme (adaptive modulation and coding), and computing and applying complex transmit weights to each subcarrier to compensate for frequency selective fading (pre-equalization). Techniques for computing these types of transmit weights from a given channel response are available in the art.

Figures 10, 11:
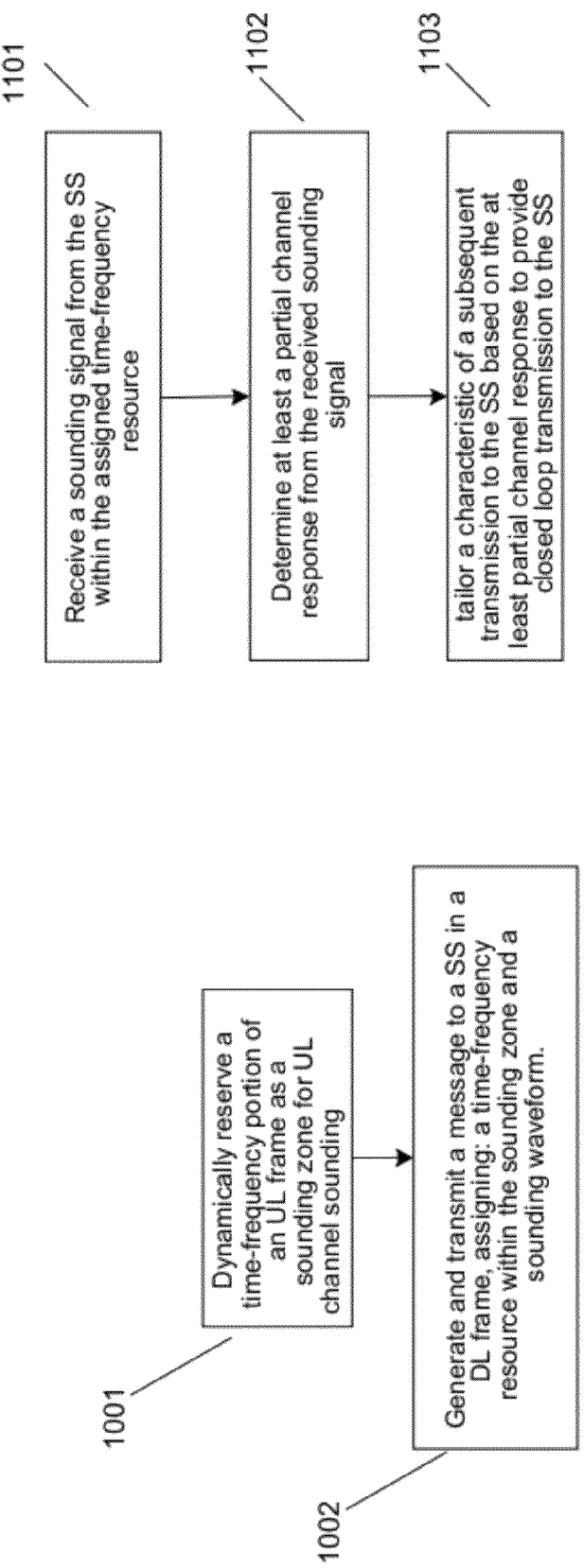
FIG. 10 is a flowchart showing the operation of the uncoupled sounding method in the downlink.
FIG. 11 is a flowchart showing the operation of the uncoupled sounding method in the uplink.

FIG. 10 is a flowchart showing the operation of the uncoupled sounding method in the downlink. The process begins with step 1001 wherein a time-frequency portion of an uplink frame is dynamically reserved as a sounding zone for UL channel sounding. Flow proceeds to step 1002 wherein a message is generated and transmitted to an SS in a downlink frame, which assigns a time frequency resource within the sounding zone and a sounding waveform to the SS for the SS to use in order to sound the uplink channel. For an OFDM system, a time-frequency resource is a set of subcarriers and a set of OFDM symbol periods or bauds. Note that the subcarriers in the set are not required to be contiguous (see 602 of FIG. 6 for example), and the symbol periods are not required to be contiguous.

FIG. 11 is a flowchart showing the operation of the uncoupled sounding method in the uplink. The process begins in step 1101 wherein the BS receives a sounding signal from the SS within the assigned time frequency resource in the sounding zone. Flow proceeds to step 1102 wherein the BS determines at least a partial channel response (e.g., channel response information for part of the frequency band) from the received sounding signal (or waveform). Finally in step 1103, the base tailors a characteristic (e.g., power, modulation and coding level, transmit antenna weights, spatial characteristics, etc.) of a subsequent transmission to the SS based on the at least partial channel response to provide closed loop transmission to the SS.

Coupled Sounding Method

A second embodiment for telling a SS to transmit a sounding waveform in the UL is to piggy-back the sounding command on a DL data allocation message in the control channel (preferably the DL control channel, or DL-MAP in the terminology of IEEE 802.16d). The strategy is for the base to transmit on the control channel one IE or control message, called the DL_Coupled_Sounding_Allocation_IE( ), that contains two parts: The first part reserves a portion of the DL frame for data transmission to a particular SS. The second part provides an abbreviated set of sounding instructions that will tell the SS to transmit sounding in the UL portion of the frame. To reduce the amount of signaling required to specify the sounding waveform characteristics, the frequency characteristics of the sounding waveform are not explicitly included in the DL_Coupled_Sounding_Allocation_IE( ), but rather are derived implicitly by the SS from the frequency characteristics of the DL data allocation contained in the first part of the IE. This method has the advantage of reducing the need to signal the frequency characteristics of the sounding waveform. This method has advantages when the BS knows that the DL in the next TDD frame will contain a DL data allocation that has the same frequency characteristics as the DL data allocation in the current frame. In this situation, the BS can save some signaling information by transmitting the DL_Coupled_Sounding_Allocation_IE( ) and inferring the frequency characteristics of the requested sounding waveform according to the frequency characteristics of the DL data allocation in the DL.

Figure 12:
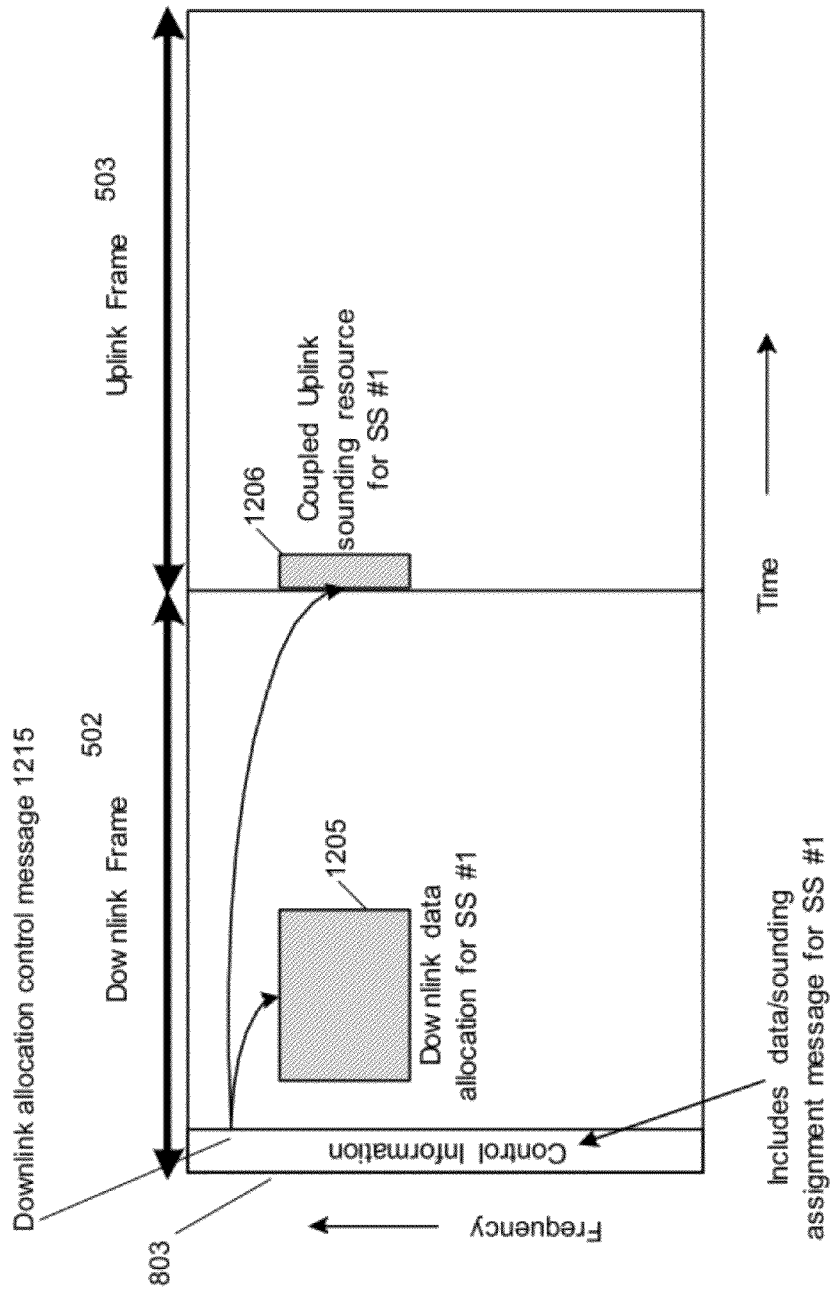
FIG. 12 is a timing diagram showing the coupled sounding method wherein a subscriber station (SS) is simultaneously given a downlink data allocation including a command to transmit a sounding signal in the uplink sounding zone.

FIG. 12 contains a timing diagram showing how the coupled sounding method operates. In contrast to FIG. 8, a single downlink allocation control message 1215 or information element (IE) within the control information 803 (control channel) simultaneously assigns the DL data allocation 1205 for SS#1 and contains the information needed by the SS to transmit a sounding waveform 1206 on the same part of the band occupied by the downlink data allocation 1205. The sounding 1206 transmitted by the SS is used by the BS to enable a closed-loop DL data transmission in the DL of the next frame, not the current frame.

Figure 13:
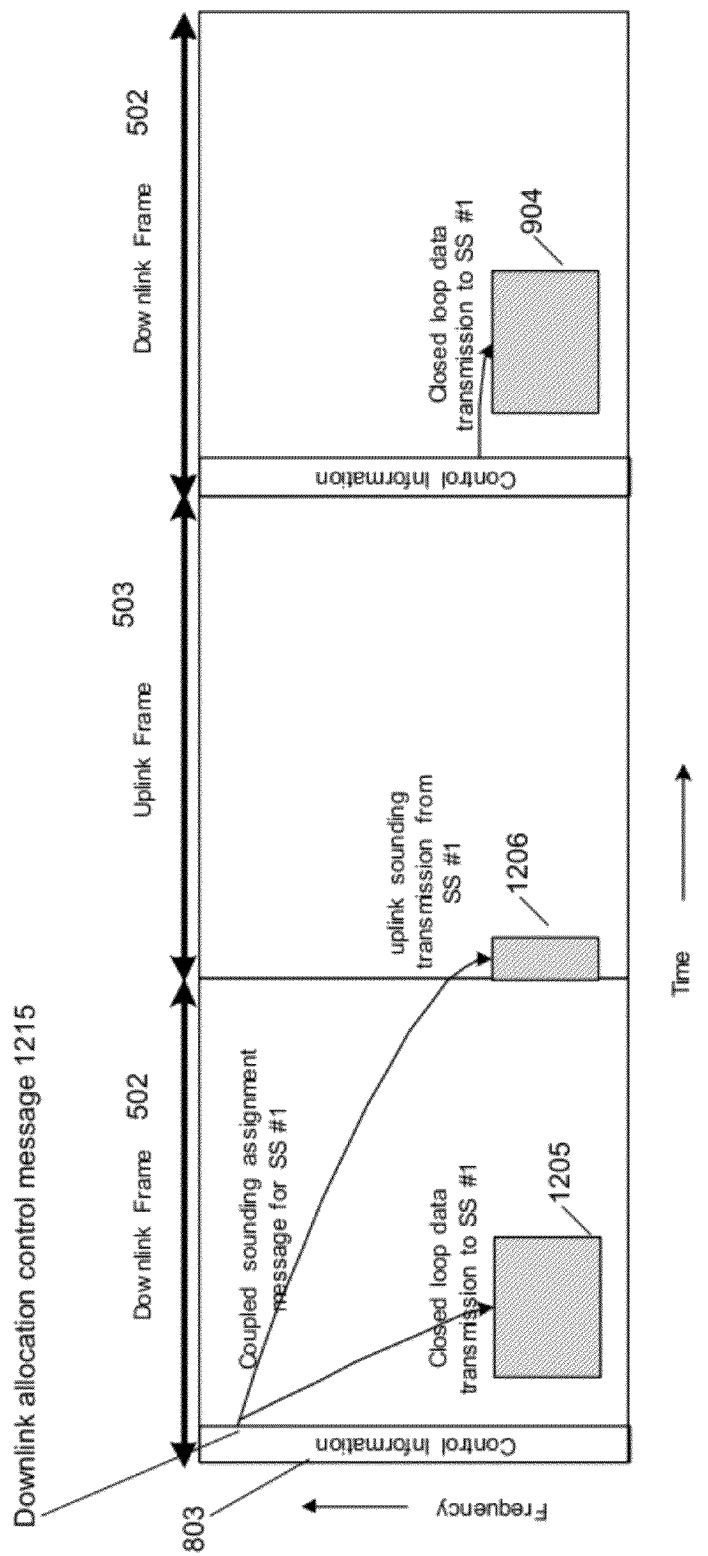
FIG. 13 is a timing diagram showing the coupled sounding method followed by a closed-loop transmission

As shown in FIG. 13, the sounding transmission in the UL portion 503 of the first TDD frame is then followed by a DL closed-loop data transmission 904 in the DL of the next TDD frame. A single downlink allocation control message 1215 or information element (IE) within the control information 803 (control channel) simultaneously assigns the DL data allocation 1205 for SS#1 and contains the information needed by the SS to transmit a sounding waveform 1206 on the same part of the band occupied by the downlink data allocation 1205. The sounding 1206 transmitted by the SS used by the BS to enable a closed-loop DL data transmission 904 in the DL of the next frame, not the current frame. In an alternative embodiment, the information learned from the sounding waveform 1206 may be used in a closed loop data transmission that is performed at any subsequent frame, not necessarily only at the immediately following frame shown in FIG. 13. One example for this scenario is when the channel varies slowly. In this case, the closed-loop transmission may be performed based on the information learned from any number of previously transmitted sounding waveforms, the closed loop transmission will not be limited to only the portion of the frequency band that coincides with the portion of the frequency band occupied by the uplink sounding waveform 1206 received in the UL 503 of the immediately preceding frame shown in FIG. 13. Instead, FIG. 13 just shows the timing diagram for high-mobility cases when the most prompt channel knowledge is desired.

FIG. 14 is a flowchart showing the operation of the coupled sounding method in the downlink. The process begins with step 1401 wherein a time-frequency portion of an uplink frame is dynamically reserved as a sounding zone for UL channel sounding. Flow proceeds to step 1402 wherein a message is generated and transmitted to an SS in a downlink frame, and this message assigns a time-frequency resource in the DL frame for the SS to receive DL data and also assigns a time frequency resource within the sounding zone and a sounding waveform to the SS for the SS to use in order to sound the uplink channel. In step 1402 the frequency resource within the sounding zone is implicitly assigned based on the time frequency resource assigned to the SS for receiving DL data.

FIG. 15 is a flowchart showing the operation of the uncoupled sounding method in the uplink. The process begins in step 1501 wherein the BS receives a sounding signal from the SS within the assigned time-frequency resource in the sounding zone. Flow proceeds to step 1502 wherein the BS determines at least a partial channel response (e.g., channel response information for part of the frequency band) from the received sounding signal (or waveform). Finally in step 1503, the base tailors a characteristic (e.g., power, modulation and coding level, transmit antenna weights, spatial characteristics, etc.) of a subsequent transmission to the SS based on the at least partial channel response to provide closed loop transmission to the SS.

Specifying the Sounding Waveform

As described earlier, in the preferred embodiment, the sounding zone consists of a time-frequency grid of 32 sounding frequency blocks by some number of sounding bauds that can be dynamically adjusted according to the level of DL traffic that will use closed-loop transmission. This section describes how SSs are allocated time-frequency resource within the UL Sounding Zone and how SSs are told which waveform to transmit.

In the preferred embodiment, an SS that will be transmitting sounding information on the UL will be given a sounding allocation or assignment which specifies the time-frequency resource within the sounding zone that the SS will use to transmit the sounding waveform. In the preferred embodiment, the time-frequency resource given to an SS consist of a contiguous set of sounding frequency blocks across frequency within one OFDM baud interval in the sounding zone. Other embodiments such as allocating non-contiguous frequency blocks or more than one sounding baud are also within the scope of the invention. The important point is that the time-frequency resource is specified by the sounding assignment.

In addition to the time-frequency resource to be used for sounding, the SS must known what specific transmitted signal or waveform that is to be used within the assigned time-frequency resource. In the preferred embodiment, this is accomplished by specifying several parameters of the sounding waveform, including:

A sequence index. This specifies the particular sequence that the SS will use within the time-frequency sounding resource. It is preferable to base the sequence on the Generalized Chirp-Like (GCL) sequences as are known in the art because of their low cross correlation properties. However, sequences other than GCL sequences are possible to use. It is advantageous to use different sets of GCL sequences to multiple co-channel base stations so that the low cross correlation properties enable the suppression of other GCL sequences being transmitted from other co-channel cells. In the preferred embodiment, the GCL sequence used for sounding is specified as follows. First, the SS will calculate the length of the frequency domain sounding sequence Ls, which is equal to the number of occupied subcarriers, from the contiguous set of sounding frequency blocks (sounding band) that the BS instructs the SS to sound, and the separability type (or mode) and separability parameters (defined later), all defined in the message UL_Uncoupled_Sounding_IE( ) received from the BS. Then the SS determines the smallest prime number $N_G$ that is larger than Ls. The resulting sounding sequence is then:

$$s_u(k) = \exp\left\{-j2\pi u \frac{k(k+1)}{2N_G}\right\}, k = 0 \ldots L_S - 1$$

where k is the sequence element index and u is referred to as "sequence class index" that is calculated from the assigned sequence index and the Cell ID of the BS as follows:

v1=1+decimal value of lowest 3 bits of the Cell ID v2=1+decimal value of the sequence index $$u=((v1)(v2)-1)\bmod(N_G-1)+1$$

In an alternative embodiment, the sequence index points to a certain class index u in a pre-stored table. This u is used to define the sounding sequence as above. A different table can be assigned to different co-channels cells, either in a pre-determined fashion or through dynamic allocation, to enable the suppression of other GCL sequences being transmitted from other co-channel cells.

A separability type (or mode) flag. This flag indicates the separability method being used, where the separability method refers to the method by which multiple transmitted sounding waveforms can occupy the same time-frequency resource while being separable at the BS receiver. The first separability type is for the sounding waveform to utilize or occupy only a subset of the subcarriers contained in the time-frequency resource. Then, different SSs can use disjoint groups of subcarriers within the time-frequency resource simultaneously without interfering with each other's sounding signals. In the preferred embodiment, disjoint groups of subcarriers are provided by using a "comb" structure across the subcarriers belonging to the sounding allocation. In other words, the sounding waveform only occupies every $N^{th}$ subcarrier within the time-frequency resource. This type of occupancy across the subcarriers is a form of interleaved frequency division, and may also be called decimated subcarriers. Other SS sounding waveforms can occupy the same time-frequency resource within the sounding allocation but by occupying a different "starting offset" of every N'th subcarrier across the sounding allocation. Separability is achieved with this method by the fact that multiple sounding waveforms occupy different sets of every Nth subcarrier across the sounding allocation. This type of sounding is also called frequency interleaving or decimated subcarriers, separability by frequency decimation, or separability by frequency division, or separating by interleaving the subcarriers occupied by the different sounding waveforms. This type of sounding is illustrated in FIG. 16 with elements 1601, 1602, 1603, 1604, and 1620. The second separability type is for the sounding waveform to occupy every subcarrier of the time-frequency assignment, and multiple sounding waveforms can occupy the same time-frequency assignment as long as they have cross correlation properties that enable the BS to estimate the channel response from each SS transmitting within the same time-frequency assignment. This type of sounding sequence separability is illustrated in FIG. 16 with elements 1611, 1612, 1613, 1614, and 1621. Note that in the preferred embodiment that the separability flag indicates one of two separability modes. However, the invention allows the separability flag to possibly indicate more than two separability modes if necessary.

Separability parameter: For the two types of separability described above, the separability parameter is used as follows: For frequency-interleaving or decimated subcarriers separability, the separability parameter specifies a subcarrier set offset index, (i.e., which of the N possible sets of every N'th subcarrier is to be occupied by the sounding waveform). For sequence separability across the sounding allocation, the separability parameter provides additional information that is used together with the sequence index to determine the specific sounding waveform. In the preferred embodiment, the sequence index determines a basic sequence to be used and the separability parameter indicates a cyclic time shift amount that is to be applied to the sounding waveform in the time domain (after the IFFT in an OFDM system) prior to transmission. In this case, the separability parameter indicates how to modify the sequence derived from the sequence index to obtain the final sounding waveform.

Multiple antenna parameter: For a SS with multiple transmit antennas, this parameter indicates whether the SS should sound on one antenna or on all of its transmit antennas. Alternatively, this parameter could be expanded to explicitly identify which set of antennas are to be sounded by the SS. If this parameter indicates that multiple antennas to be sounded, then the separability parameter is to be applied for antenna 1, and the remaining transmit antennas are implicitly assigned to employ subsequent separability parameters in sequence, while all antennas use the same time-frequency resource.

FIG. 16 illustrates the two methods of the preferred embodiment for achieving separability in the sounding waveforms to be used on a portion of the sounding zone indicated by 1605. In an OFDM system as assumed in FIG. 16, the frequency band includes time-frequency elements 1606 consisting of a single OFDM subcarrier within a single OFDM symbol period. In the interleaved subcarrier separability type, the same time-frequency resource 1620 is assigned to four SSs (or possibly four transmit antennas on a single SS), but some of the elements 1606 of the time-frequency resource are assigned to SS transmitter #1 (1601), some are assigned to SS transmitter #2 (1602), some are assigned to SS transmitter #3 (1603), and some are assigned to SS transmitter #4 (1604). Because different elements 1606 are assigned to different SS transmitters, separability can be achieved at the BS receiver because the sounding transmissions occupy different (disjoint) sets of OFDM subcarriers and are therefore orthogonal.

For the sequence orthogonality type method illustrated in FIG. 16, four SS transmitters (1611-1614) transmit on the same set of subcarriers. SS transmitter #1 uses sequence 1 (1611), SS transmitter #2 uses sequence 2 (1612), SS transmitter #3 uses sequence 2 (1613), and SS transmitter #4 uses sequence 4 (1614). Separability is achieved at the BS by virtue of the sequences 1611, 1612, 1613, and 1614 having appropriate cross-correlation properties.

Note that in FIG. 16 that the different SS transmitters can all be on the same SS or can be on different SSs, or on a combination of single and multiple antenna SSs.

As noted above, the invention enables multiple SSs to perform channel sounding on the same time-frequency resource. In the preferred embodiment, when multiple SSs, for example two SSs, should be sounded, the BS will format and transmit a first message to a first SS, format and transmit a second message to a second SS in the same DL frame, where the first and second messages assigning the same time-frequency resource in the UL sounding zone, but assigning different waveforms to the first and second SS. When using the preferred sounding waveform specification approach described above, the first and second SSs are assigned the same separability mode, but a different separability parameter.

When multiple SS transmitters (on the same or different SSs), for example two SSs, are assigned the same time-frequency resource for sounding, the BS will receive a composite or summation of a first and second sounding signal transmitted from the first and second SS within the assigned time-frequency resource. The BS then determine at least a partial channel response for each of the first and second SS from the received composite sounding signal. This is enabled by assigning separable waveforms to the SSs and processing the received composite signal to separate the channel responses (e.g., by taking advantage of the disjoint subcarriers or the cross correlation properties). After obtaining the channel responses, the BS can tailor a characteristic of a subsequent transmission to at least the first SS based on the at least partial channel response of the first SS to provide closed loop transmission to the SS.

Figure 17:
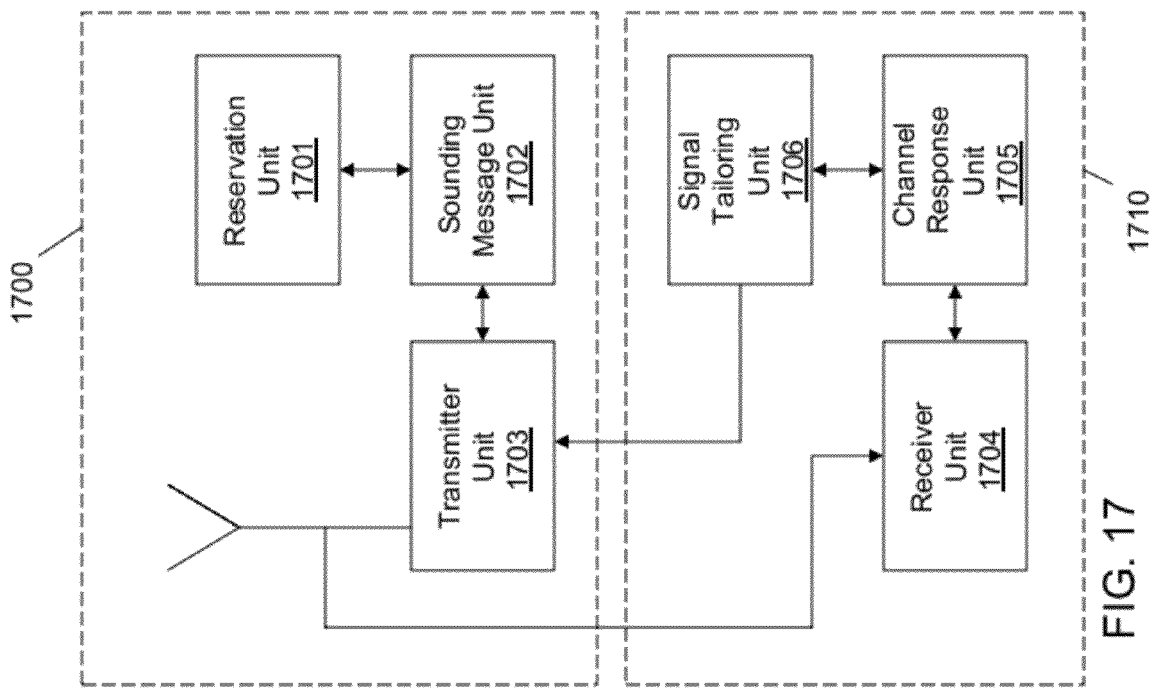
FIG. 17 shows an apparatus for providing closed loop transmission.

Apparatuses for Transmitting a Channel Sounding Message and for Transmitting a Sounding Signal FIG. 17 is a block diagram of an apparatus within a source communication unit containing a unit for transmitting a channel sounding message 1700 plus a unit 1710 for tailoring a characteristic of a transmission to a target communication unit to provide closed loop transmission. The unit for transmitting a channel sounding message 1700 consists of a reservation unit 1701, a sounding message unit 1702, and a transmitter unit 1703. The reservation unit 1701 dynamically reserves a time-frequency portion of a frame as a sounding zone for channel sounding. The sounding message unit 1702, which is coupled with the reservation unit 1701, generates a channel sounding assignment message specifying a time-frequency resource within the sounding zone, and a sounding waveform to be used. The transmitter unit 1703, which is operably coupled with the sounding message unit 1702, transmits the channel sounding assignment message. The unit for tailoring a characteristic of a transmission to the target unit 1710 consists of a receiver unit 1704, a channel response unit 1705, and a signal tailoring unit 1706. The receiver unit 1704 receives a sounding signal transmitted from a target unit within an assigned time-frequency resource. The channel response unit 1705, which is coupled with the receiver unit 1704, determines at least a partial channel response from the received sounding signal. The signal tailoring unit 1706, which coupled with the channel response unit 1705 and the transmitter unit 1703, tailors a characteristic of a transmission to the target unit based on the at least partial channel response.

Figure 18:
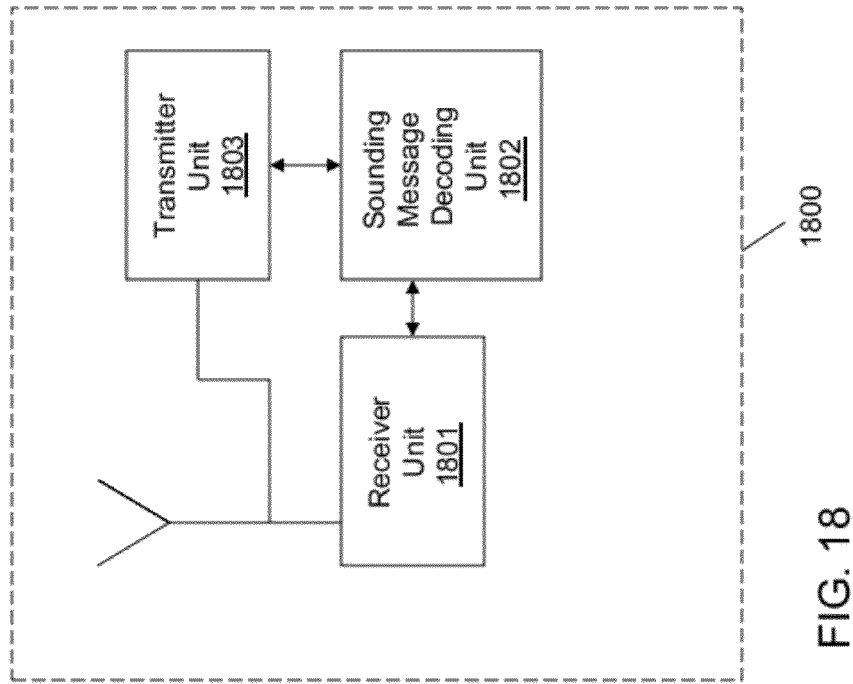
FIG. 18 shows an apparatus for performing channel sounding.

FIG. 18 is a block diagram of an apparatus within a target communication unit for transmitting a sounding signal 1800 and consists of a receiver unit 1801, a sounding message decoding unit 1802, and a transmitter unit 1803. The receiver unit 1801 receives a channel sounding assignment message from a source communication unit. The sounding message decoding unit 1802, which is coupled with the receiver unit 1801, determines from the sounding assignment message: a time-frequency resource in a frame, and a sounding signal, to be used for transmitting a sounding signal. The transmitter unit 1803, which is coupled with the sounding message decoding unit 1802, transmits the sounding signal within the assigned time-frequency resource in the frame.

Messaging Formats in Preferred Embodiment

The following is a detailed description of the preferred messaging formats for an IEEE 802.16-like system that uses DL and UL maps to assign resources in the DL frame and UL frame, respectively. Note that most of the acronyms used in this section are defined in the IEEE 802.16 family of specifications. In the UL-MAP (UL control channel), a BS may transmit UIUC=15 with the UL_Sounding_Zone_Presence_IE( ) to indicate to all the SS the allocation of an UL sounding zone within the frame. The BS may command a SS to transmit a sounding signal at one or more OFDMA symbols in the sounding zone according to either the extended UL-MAP message UL_Uncoupled_Sounding_IE( ) or the extended DL-MAP message DL_MAP_Coupled_Sounding_IE( ).

The definition of a sounding zone in UL_Sounding_Zone_Presence_IE( ) makes it more efficient for later specifying the sounding symbol(s) that a SS will use to send the sounding signal(s), because only the relative position of the sounding symbol in the sounding zone can be specified. Otherwise, to indicate the absolute sounding symbol offset, a 10-bit field would need to be used in each UL_Sounding_Zone_Presence_IE( ) to each SS to be sounded.

| Syntax | Size | Notes |
|---|---|---|
| UL_Sounding_Zone_Allocatoin_IE( ){ | | |
| Extended UIUC | 4 bits | 0x03 |
| Sounding Zone Length | 3 bits | Duration of the sounding zone (up to 8 OFDMA symbols) |
| OFDMA symbol offset | 10 bits | Starting symbol of the sounding zone |
| } | | |

The SS-specific sounding instruction is transmitted from the base to a SS in UL_Uncoupled_Sounding_IE( ) where a CID is included. The definition of the sounding zone is in UL_Sounding_Zone_Presence_IE( ) that is targeted to all SS. The SS-specific message UL_Uncoupled_Sounding_IE( ) instructs the SS to transmit specific sounding signal(s) at one or more specific symbol(s) within the sounding zone and to occupy specific frequency band(s) for each of these sounding symbol(s). In this case, the sounding frequency allocations are independent (uncoupled) from the presence or absence of any DL data assignments to the SS in the DL-MAP.

| Syntax | Size | Notes |
|---|---|---|
| UL_Uncoupled_Sounding_IE( ){ | | |
| Extended UIUC | 4 bits | 0x04 |
| CID | 16 bits | |
| Num_used_symbols | 3 bits | Number of sounding symbols this SS uses, from 1 (bits "000") to $2^3$=8 (bits "111") |
| for (i=0;i<Num_used_symbols;i++){ | | |
| Sounding symbol index | 3 bits | Symbol index in the zone, from 1 (bits "000") to $2^3$=8 (bits "111") |
| Starting frequency band | 5 bits (or 6 bits) | Out of 32 (or 48) bands |
| Number of bands | 5 bits (or 6 bits) | Contiguous bands used |
| Sounding sequence index | 2 bits | Sequence index within a pre-defined 4-member group (several groups are pre-defined to be used in different sectors) |
| Separability flag | 1 bit | 0: sound all subcarriers in the assigned bands; 1: sound decimated sub carriers |
| Length of Separability Parameter ("L") | 3 bits | Define the length of the next field, which varies from 1 (bits "000") to $2^3$=8 (bits "111") |

| Syntax | Size | Notes |
|---|---|---|
| if (Separability flag==0) { Separability Parameter (Cyclic time shift index) | Variable length | Cyclically shift the time domain symbol by multiples (from 0 to $2^L -1$) of a CP length |
| } Else { Separability Parameter (Decimation offset) | Variable length | Relative starting offset position among the $2^L$ possibilities for the first sounding subcarrier |
| } Multi-antenna sounding mode | 1 bit | 0: sound the first antenna; 1: sound all the antennas, using the above-defined sequence as the starting shift or decimation offset for the first antenna, and stepping through the remaining shifts or decimation offsets for each additional antenna |
| } | | |

The SS-specific sounding instruction can also be transmitted from the BS to a SS as part of the DL-MAP information. The following DL-MAP_Coupled_Sounding_IE( ) shall not be used unless the UL_Sounding_Zone_Presence_IE( ) is present in the same frame. DL-MAP_Couped_Sounding_IE( ) commands the SS to transmit at one or more specific symbols within the sounding zone using specific sounding signals. In this case, the sounding frequency band information is derived from the DL allocations (thus the name "coupled sounding").

| Syntax | Size | Notes |
|---|---|---|
| DL-MAP_Coupled_Sounding_IE( ){ | | |
| Extended DIUC | 4 bits | |
| If (INC_CID==1) { | | |
| N_CID | 8 bits | |
| For (n=0;n<N_CID;n++){ | | |
| CID | 16 bits | |
| } | | |
| } | | |
| OFDMA Symbol Offset | 10 bits | |
| Subchannel offset | 5 bits | |
| Boosting | 3 bits | |
| No. OFDMA Symbols | 9 bits | |
| No. Subchanels | 5 bits | |
| Num_sounding_symbols | 3 bits | Number of sounding symbols this SS uses |
| for (I=0;I<Num_sounding_symbols;I++){ | | |
| Sounding symbol index | 3 bits | Symbol index in the zone |
| Sounding sequence index | 2 bits | Sequence index within a pre-defined 4-member group (several groups are pre-defined to be used in different sectors) |
| Separability flag | 1 bit | 0: sound all subcarriers in the assigned bands; 1: sound decimated subcarriers |
| Length of the Separability Parameter (L) | 3 bits | Define the length of the next field, which varies from 1 (bits "000") to $2^3$=8 (bits "111") |
| If (Separability flag==0) { Separability Parameter (Cyclic time shift index) | Variable length | Cyclically shift the time domain symbol by multiples (from 0 to $2^L -1$) of a CP length |
| } Else { Separability Parameter (Decimation offset) | Variable length | Relative starting offset position among the $2^L$ possibilities for the first sounding subcarrier |
| } Multi-antenna sounding mode | 1 bit | 0: sound the first antenna; 1: sound all the antennas, using the above-defined sequence as the starting shift or decimation offset for the first antenna, and stepping through the remaining shifts or decimation offsets for each additional antenna |
| } | | |

The sounding frequency band information may also be uncoupled from the DL allocations, which is not shown here. In addition, uncoupled and coupled sounding messages can be appended to existing 802.16d downlink messages to achieve some saving in messaging overhead, as shown in the next two tables.

| Syntax | Size | Notes |
|---|---|---|
| MIMO_DL_Basic-Uncoupled_Sounding_IE( ){ | | |
| Extended DIUC | 4 bits | 0x05 |
| Length | 4 bits | Length in Bytes |
| Num_Region | 4 bits | |
| for ( i = 0; i< Num_Region;i++) { | | |
| OFDMA Symbol offset | 10 bits | |
| Subchannel offset | 5 bits | |
| Boosting | 3 bits | |
| No. OFDMA Symbols | 9 bits | |

-continued

| Syntax | Size | Notes |
|---|---|---|
| No. subchannels | 5 bits | |
| Matrix_indicator | 2 bits | STC matrix (see 8.4.8.4.) Transmit_diversity = transmit diversity mode indicated in the latest TD_Zone_IE( ).<br>if (Transmit_Diversity = 01)<br>{<br>00 = Matrix A<br>01 = Matrix B<br>10 – 11 = Reserved<br>}<br>elseif (Transmit_Diversity = 10)<br>{<br>00 = Matrix A<br>01 = Matrix B<br>10 = Matrix C<br>11 = Reserved<br>} |
| Closed-loop MIMO flag | 2 bits | 00 = Open-loop<br>01 = Closed-loop TxAA (meaning the following Num layer=1)<br>10 = Closed-loop MIMO<br>11 = Closed-loop SDMA<br>(SS reacts by using different receive and channel estimation algorithms accordingly) |
| Num_layer<br>for (j = 0; j< Num_layer; j++){<br>  if (INC_CID == 1) { | 2 bits | |
|     CID | 16 bits | |
|   }<br>  Layer_index<br>}<br>}<br> Num_used_symbols | 2 bits<br><br><br><br>3 bits | <br><br><br><br>Number of sounding symbols this SS uses, from 1 (bits "000") to $2^3$=8 (bits "111") |
| for (i=0;i<Num_used_symbols;i++){ | | |
|   Sounding symbol index | 3 bits | Symbol index in the zone, from 1 (bits "000") to $2^3$=8 (bits "111") |
|   Starting frequency band | 5 bits (or 6 bits) | Out of 32 (or 48) bands |
|   Number of bands | 5 bits (or 6 bits) | Contiguous bands used |
|   Sounding sequence index | 2 bits | Sequence index within a pre-defined 4-member group (several groups are pre-defined to be used in different sectors) |
|   Separability flag | 1 bit | 0: sound all subcarriers in the assigned bands; 1: sound decimated subcarriers |
|   Length of Separability Parameter ("L") | 3 bits | Define the length of the next field, which varies from 1 (bits "000") to $2^3$=8 (bits "111") |
|   if (Separability flag==0) {<br>    Separability Parameter<br>    (Cyclic time shift index)<br>  } | <br>Variable length | <br>Cyclically shift the time domain symbol by multiples (from 0 to $2^L$ −1) of a CP length |
|   Else {<br>    Separability Parameter<br>    (Decimation offset)<br>  } | <br>Variable length | <br>Relative starting offset position among the $2^L$ possibilities for the first sounding subcarrier |
|   Multi-antenna sounding mode | 1 bit | 0: sound the first antenna; 1: sound all the antennas, using the above-defined sequence as the starting shift or decimation offset for the first antenna, and stepping through the remaining shifts or decimation offsets for each additional antenna |
| } | | |

| Syntax | Size | Notes |
|---|---|---|
| MIMO_DL_Basic-Uncoupled_Sounding_IE( ){ | | [Existing field in MIMO_DL_Basic_IE( ) from accepted contribution 80r1 shown in red] |
| Extended DIUC | 4 bits | 0x05 |
| Length | 4 bits | Length in Bytes |
| Num_Region | 4 bits | |
| for ( i = 0; i< Num_Region;i++) { | | |
| OFDMA Symbol offset | 10 bits | |
| Subchannel offset | 5 bits | |
| Boosting | 3 bits | |
| No. OFDMA Symbols | 9 bits | |
| No. subchannels | 5 bits | |
| Matrix_indicator | 2 bits | STC matrix (see 8.4.8.4.) Transmit_diversity = transmit diversity mode indicated in the latest TD_Zone_IE( ). if (Transmit_Diversity = 01) { 00 = Matrix A 01 = Matrix B 10 – 11 = Reserved } elseif (Transmit_Diversity = 10) { 00 = Matrix A 01 = Matrix B 10 = Matrix C 11 = Reserved } |
| Closed-loop MIMO flag | 2 bits | 00 = Open-loop 01 = Closed-loop TxAA (meaning the following Num_layer=1) 10 = Closed-loop MIMO 11 = Closed-loop SDMA (SS reacts by using different receive and channel estimation algorithms accordingly) |
| Num_layer | 2 bits | |
| for (j = 0; j< Num_layer; j++){ | | |
| if (INC_CID == 1) { | | |
| CID | 16 bits | |
| } | | |
| Layer_index | 2 bits | |
| } | | |
| } | | |
| Num_used_symbols | 3 bits | Number of sounding symbols this SS uses, from 1 (bits "000") to $2^3$=8 (bits "111") |
| for (i=0;i<Num_used_symbols;i++){ | | |
| Sounding symbol index | 3 bits | Symbol index in the zone, from 1 (bits "000") to $2^3$=8 (bits "111") |
| Sounding sequence index | 2 bits | Sequence index within a pre-defined 4-member group (several groups are pre-defined to be used in different sectors) |
| Separability flag | 1 bit | 0: sound all subcarriers in the assigned bands; 1: sound decimated subcarriers |
| Length of Separability Parameter ("L") | 3 bits | Define the length of the next field, which varies from 1 (bits "000") to $2^3$=8 (bits "111") |
| if (Separability flag==0) { | | |
| Separability Parameter (Cyclic time shift index) | Variable length | Cyclically shift the time domain symbol by multiples (from 0 to $2^L$ −1) of a CP length |
| } | | |
| Else { | | |
| Separability Parameter (Decimation offset) | Variable length | Relative starting offset position among the $2^L$ possibilities for the first sounding subcarrier |
| } | | |
| Multi-antenna sounding mode | 1 bit | 0: sound the first antenna; 1: sound all the antennas, using the above-defined sequence as the starting shift or decimation offset for the first antenna, and stepping through the remaining shifts or decimation offsets for each additional antenna |
| } | | |

Additional Information on Sounding Waveforms

The sounding waveforms are chosen to enable the BS to estimate the uplink channel for the frequency band of interest. Due to the limited transmit power of the mobile devices, especially handheld devices, it is important to improve the uplink link budget, which can be achieved by different means such as power boosting allowed by transmitting on smaller bandwidth and on decimated subcarriers only. Another important means is to improve the PAPR of the OFDM-style sounding waveforms. A good candidate for using as sounding waveform is the Generalized Chirp Like (GCL) waveforms which are a non-binary unit-amplitude sequences. For different sequence length, there are a number of GCL sequences (referred to as "classes"). When applied on uniformly spaced OFDM subcarriers, the time domain signals also have unit amplitudes if the time domain discrete time signal is at exactly the Nyquist sampling rate. But due to the guard subcarriers used in all practical OFDM systems, the time domain waveform is equivalent to performing oversampling after a "sinc" pulse shaping filter. The resulting PAPR will not have exact unit-amplitude, but a large number of the GCL sequences for any particular length still enjoy low PAPR (typically 3-4 dB).

The GCL sequence used for sounding is expressed as $$s_u(k) = \exp\left\{-j2\pi u \frac{k(k+1)}{2N_G}\right\}, k = 0 \ldots N_G - 1 \quad (1)$$

and $u$ ("class index") = $1 \ldots N_G - 1$ where $N_G$ is the length of a GCL sequence (chosen as a prime number, explained later) and u is referred as the class index that is a non-zero integer chosen between 1 and $N_G$. The GCL sequence has the following important properties:

Property 1: The GCL sequence has constant amplitude, and its $N_G$-point DFT has also constant amplitude.

Property 2: The GCL sequences of any length have an "ideal" cyclic autocorrelation (i.e., the correlation with the circularly shifted version of itself is a delta function)

Property 3: The absolute value of the cyclic cross-correlation function between any two GCL sequences is constant and equal to $1/\sqrt{N_G}$, when $|u1-u2|$, $u1$, and $u2$ are relatively prime to $N_G$.

The cross-correlation $1/\sqrt{N_G}$ at all shifts (Property 3) is actually the minimum achievable value for any two sequences that have the ideal autocorrelation property (i.e., the maximum value of the cross-correlation at all shifts is minimized which is equal to $1/\sqrt{N_G}$. This property is important when a number of potential interfering sequences are used, either in a single sector or in a multi-sector environment. The cross correlation property allows the interfering signal evenly spread in the time domain after correlating with the desired one. Hence, the channel of the desired user can be detected more reliably (e.g., with a "de-noising" estimator).

The number of excited subcarrier in a sounding waveform is often not a prime number. For example, if a band of 36 subcarriers are sounded, the length of the frequency-domain sounding sequence is 36. In this case, we propose to choose the smallest prime number that is larger than the desired length (e.g., 37 in above case), then truncating it to the desired length. An alternative is to choose the largest prime number that is smaller than the desired length (e.g., 31 in the above case), then cyclically extending it to the desired length. When such a modification is performed, the three properties will only hold approximately, but it is found that they still hold very well, especially when the sequence is long.

For any desired sounding sequence length (say $L_s$), as mentioned earlier, due to the use of oversampling effect introduced by applying the sequence only a contiguous subset of subcarriers, the PAPR will be increase a little bit. But for each length value, the sequence class indices that give the best PAPR can be pre-stored. They can be divided in to a number of groups ($N_{gr}$, say 6) with each group consists of a number of sequence classes ($N_{cl}$, say 4). So, different group will be assigned to neighboring sectors and each sector can use one of the classes (sequences) in its assigned group. The group assignment is conveyed from the BS sector to all users its serving area. In one embodiment, each sector of a BS has an identification (ID) number. There is a one-to-one correspondence between the groups and the ID number. Therefore the sequences can be stored by each SS, and the appropriate sequence group can be selected by the SS based on the BS ID.

Although the sounding waveforms are assigned by the BS to SS in an orthogonal fashion, in which only a single sequence for each group is required, pre-assigning $N_{cl}$ sequences for each group gives the option to use more sequences when there are not enough orthogonal waveforms. At least, the additional sequences used will have minimal cross-correlation. Note that the each pair the sequences, no matter from the same group or from different groups, will have the minimum cross correlation property. Note that for best PAPR, a GCL sequence should excite uniformly spaced subcarriers (spacing can be one). If an excited subcarrier falls at the DC subcarrier, the corresponding element of the GCL sequences should be used, although it can be set to zero before IFFT is taken.

Other than allocating a disjoint subset of the sounding subcarriers to different users to guarantee orthogonality, the other way to separate the user channel in by transmitting a cyclically shifted version of the same sequence by other users. For example, the first user transmit the sequence in (1) and the m-th user transmits the following sequence:

$$s_{u,m}(k)=s_u(k)e^{-j2\pi k(m-1)L_{CP}/N}, \qquad (2)$$

where $S_u(k)$ is given in (1) and N is the FFT size (which is 2048) and $L_{CP}$ is the cyclic prefix length.

The uplink channel estimation is discussed briefly here to illustrate how the cross correlation property can be taken advantage of. Basically, a time-domain estimator with adaptive tap selection is recommended where the time-domain channel response is obtained and only taps with a power that exceeds the noise power by a certain threshold will be included. This channel estimator can adapt to the instantaneous channel delay profile, which is especially useful when the SNR is low and the channel is sparse. At moderate to high SNR cases, the MMSE channel estimator is also satisfactory with similar performance to that of the time-domain approach.

The time-domain uplink channel estimator is described as follows. Let the frequency domain data for receive antenna n at the base is Yn(k) where k is a data subcarrier. Note that Yn(k) will consist of the uplink sounding for several users or transmit antennas. First, a noisy channel estimate is obtained by multiplying by a conjugate of the GCL sequence as follows:

$$\tilde{H}_n(k)=Y_n(k)S^*_{(u)}(k) \qquad (3)$$

Next the noisy estimates are transformed to the time domain through an N-point IFFT as:

$$\tilde{h}_n(\ell) = \frac{1}{N}\sum_{k=0}^{K-1}\tilde{H}_n(k)e^{j2\pi\ell k/N} \quad 0 \leq \ell \leq N-1 \qquad (4)$$

where K is the number of sounding subcarriers. N can use chosen as the smallest integer than is bigger than K and is the power of 2. In the case of sounding waveform as specified in (2), the different users' (or transmit antennas') channels are separable in the time domain. This means that an estimate of user m's time-domain channel is simply samples $(m-1)L_{CP}$ through $mL_{CP}-1$ of (3). To improve the channel estimation in low SNRs, a tap-selection strategy is proposed. Tap selection simply means that the time taps that are below some threshold, $\eta$, are set to zero. Thus tap selection improves the channel estimation for relatively sparse channels by attempting to match the channel estimator to the instantaneous power delay profile for each user. A threshold of $\eta=3$ dB stronger than the estimated SNR is an example of reasonable choices.

Let the time-domain channel estimate for all users after tap selection be denoted as $\hat{h}_n(l)$. Next denote the time-domain channel estimates for user m after the thresholding as $h_{m,n}(l)$ (where, explicitly, user m's channel is simply $h_{m,n}(l)=\hat{h}_n((m-1)L+l)$ ($0 \leq l \leq -1$)). Then the frequency-domain channel estimate for user m is the N-point FFT of $h_{m,n}(l)$:

$$H_{m,n}(k) = \sum_{\ell=0}^{L-1} h_{m,n}(\ell)e^{-j2\pi\ell k/N} \quad 0 \leq k \leq K-1 \qquad (5)$$

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept. It is intended that such modifications, alterations, and combinations come within the scope of the following claims.

We claim:

1. A method comprising:
reserving a time-frequency portion of a frame as a sounding zone for channel sounding;

generating a channel sounding assignment message specifying a time-frequency resource within the sounding zone, and a sounding signal to be used wherein the channel sounding assignment message further comprises a separability parameter of the sounding signal; and transmitting the channel sounding assignment message.

2. The method of claim 1, further comprising:

receiving a sounding signal transmitted from a subscriber station within the time-frequency portion of the frame;

determining at least a partial channel response from the sounding signal; and tailoring a characteristic of a transmission to the subscriber station based on the at least partial channel response to provide closed loop transmission to the target communication unit.

3. The method of claim 1 further comprising an identification number known to a subscriber station, and where the subscriber station determines the sounding signal to be transmitted from at least a base station identification number, a separability mode, and a sounding sequence index.

4. The method of claim 1 wherein the time-frequency portion comprises an integer number of OFDM (Orthogonal Frequency Division Multiplex) symbol periods by an integer number of OFDM subcarriers.

5. The method of claim 1 where the channel sounding assignment message further comprises a multi-antenna sounding mode for indicating a set of one or more antennas for sounding and a sounding signal for each of the antennas.

6. The method of claim 1 wherein the channel sounding assignment message further comprises a separability mode indicating that the subscriber station shall transmit on every subcarrier in the time frequency resource.

7. The method of claim 6 wherein the channel sounding assignment message further comprises a separability parameter indicating a per-subcarrier incremental phase shift value that the subscriber station shall use.

8. The method of claim 1 wherein the channel sounding assignment message further comprises a separability mode indicating that the subscriber station shall transmit on a decimated set of subcarriers in the time-frequency resource.

9. The method of claim 4 wherein the channel sounding assignment message further comprises a separability parameter indicating an index of a set of subcarriers on which the subscriber station shall transmit in the time-frequency resource.

10. The method of claim 1 wherein the channel sounding assignment message further comprises a sounding sequence index indicating the waveform that shall be transmitted on the subcarriers in the time frequency resource.

11. A method for a base station (BS) comprising the steps of:

the base station determining an uplink sounding zone within a frame, wherein the uplink sounding zone comprises a time and frequency resource; and the base station instructing the SS to transmit a specific sounding signal at one or more specific symbol intervals within the sounding zone, and the base station specifying a specific sounding frequency to be occupied within each sounding symbol interval.

12. The method of claim 11 wherein the step of determining the uplink sounding zone comprises the step of determining one or more OFDM/OFDMA symbol intervals in the frame that is used by the SS to transmit the sounding signal and enables the BS to determine a channel response between the BS and the SS.

13. The method of claim 12 wherein the step of determining the uplink sounding zone comprises the step of determining non-overlapping frequency bands, wherein each frequency band comprises a plurality of consecutive OFDM/OFDMA subcarriers.

14. The method of claim 11 wherein the step of instructing the SS to transmit the specific sounding signal additionally comprises the step of instructing the SS to transmit the sounding signal on consecutive subcarriers or decimated subcarriers.

15. The method of claim 11 wherein the step of instructing the SS to transmit the specific sounding signal additionally comprises the step of providing the SS with a total number of sounding symbols to transmit.

16. The method of claim 11 wherein the step of instructing the SS to transmit the specific sounding signal additionally comprises the step of instructing the SS to transmit the sounding signal on consecutive subcarriers or decimated subcarriers and providing the SS with a decimation value (D) instructing the SS to sound every Dth subcarrier.

17. The method of claim 11 further comprising the step of instructing a second SS to transmit a specific sounding signal at the same symbol interval within the uplink sounding zone, and specifying a specific sounding frequency to be occupied by the second SS within each sounding symbol interval.

18. The method of claim 17, further comprising the steps of:

receiving a composite of a first and second sounding signal transmitted from the first and second subscriber station within the assigned time-frequency resource;

determining at least a partial channel response for the second subscriber station from the received composite sounding signal; and tailoring a characteristic of a subsequent transmission to the second subscriber station based on the at least the partial channel response of the second subscriber station.

19. The method of claim 11 further comprising the steps of:

receiving the sounding signal transmitted from the SS within the assigned sounding zone;

determining at least a partial channel response from the received sounding signal; and tailoring a characteristic of a subsequent transmission to the SS based on the at least partial channel response.

20. The method of claim 19 where the step of tailoring comprises the step of tailoring at least one of: a frequency characteristic of the subsequent transmission, and a spatial characteristic of the subsequent transmission.

21. The method of claim 20 further comprising the step of assigning a time-frequency resource in the downlink frame for the SS to receive downlink data, and wherein a frequency part of the time-frequency resource within the sounding zone is assigned implicitly based on the time-frequency resource in the downlink frame for the SS to receive downlink data.

22. The method of claim 11 wherein the base station additionally instructs the SS on a separability type identifying a technique for maintaining signal orthgonality between multiple sounding transmissions.

23. The method of claim 22 wherein the base station additionally instructs the SS on a separability parameter identifying a cyclic shift of the specific sounding signal.

* * * * *